US008016406B2

(12) United States Patent
Hakamada et al.

(10) Patent No.: US 8,016,406 B2
(45) Date of Patent: Sep. 13, 2011

(54) AQUEOUS INK, AQUEOUS INK SET, INK CARTRIDGE, INK-JET RECORDING APPARATUS, INK-JET RECORDING METHOD, AND IMAGE-FORMING METHOD

(75) Inventors: Shinichi Hakamada, Kawasaki (JP); Takashi Imai, Yokohama (JP); Mikio Sanada, Yokohama (JP); Yasuhiro Nito, Yokohama (JP); Tetsu Iwata, Yokohama (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/576,823

(22) Filed: Oct. 9, 2009

(65) Prior Publication Data

US 2010/0075046 A1    Mar. 25, 2010

Related U.S. Application Data

(60) Division of application No. 11/313,689, filed on Dec. 22, 2005, now abandoned, which is a continuation of application No. PCT/JP2005/012277, filed on Jun. 28, 2005.

(30) Foreign Application Priority Data

Jun. 28, 2004  (JP) ................................. 2004-190555
Jun. 28, 2004  (JP) ................................. 2004-190573

(51) Int. Cl.
  *G01D 11/00* (2006.01)
(52) U.S. Cl. .............................. 347/100; 347/96; 347/95
(58) Field of Classification Search .................. 347/100, 347/95, 96, 101; 106/31.6, 31.27, 31.13; 523/160
  See application file for complete search history.

(56) References Cited

U.S. PATENT DOCUMENTS 5,451,251 A    9/1995   Mafune et al. .............. 106/22 H
(Continued)

FOREIGN PATENT DOCUMENTS

EP    0 651 037 A1    5/1995
(Continued)

OTHER PUBLICATIONS

Jan. 11, 2007 International Preliminary Report on Patentability and Written Opinion in International Application No. PCT/JP2005/012277 (English Translation).
(Continued)

*Primary Examiner* — Manish S Shah
(74) *Attorney, Agent, or Firm* — Fitzpatrick, Cella, Harper & Scinto

(57) ABSTRACT

An aqueous ink comprises water, a water-insoluble coloring material, and plurality of water-soluble organic solvents and the plurality of water-soluble organic solvents including a good medium or good mediums for the water-insoluble coloring material and a poor medium or poor mediums for the water-insoluble coloring material. The ratio of the content of the poor medium and the content of the good medium is in a specific range. A water-soluble organic solvent showing the maximum Ka value out of respective Ka values of the plurality of water-soluble organic solvents is the poor medium. When the aqueous ink is in contact with a specific reaction liquid, the dissolution state or dispersed state of the water-insoluble coloring material in the ink is made unstable. As a result, an image which has a sufficiently large area factor even with a small amount of ink droplets and is excellent in image density, bleeding resistance, and fixability can be obtained. In addition, the aqueous ink is excellent in storage stability.

13 Claims, 7 Drawing Sheets

U.S. PATENT DOCUMENTS

| | | | |
|---|---|---|---|
| 5,571,313 A | 11/1996 | Mafune et al. | 106/22 H |
| 5,782,967 A | 7/1998 | Shirota et al. | 106/31.58 |
| 5,911,815 A | 6/1999 | Yamamoto et al. | 106/31.27 |
| 6,027,210 A | 2/2000 | Kurabayashi et al. | 347/100 |
| 6,036,307 A | 3/2000 | Hakamada et al. | 347/106 |
| 6,062,674 A | 5/2000 | Inui et al. | 347/43 |
| 6,174,354 B1 | 1/2001 | Takizawa et al. | 106/31.43 |
| 6,214,963 B1 | 4/2001 | Noguchi et al. | 528/71 |
| 6,221,141 B1 | 4/2001 | Takada et al. | 106/31.6 |
| 6,280,513 B1 | 8/2001 | Osumi et al. | 106/31.6 |
| 6,332,919 B2 | 12/2001 | Osumi et al. | 106/31.6 |
| 6,367,923 B1* | 4/2002 | Koitabashi | 347/101 |
| 6,375,317 B1 | 4/2002 | Osumi et al. | 347/100 |
| 6,387,168 B1 | 5/2002 | Koitabashi et al. | 106/31.6 |
| 6,398,355 B1 | 6/2002 | Shirota et al. | 347/100 |
| 6,425,662 B1 | 7/2002 | Teraoka et al. | 347/100 |
| 6,474,778 B1* | 11/2002 | Koitabashi et al. | 347/43 |
| 6,474,803 B1 | 11/2002 | Shirota et al. | 347/100 |
| 6,498,222 B1* | 12/2002 | Kitamura et al. | 347/100 |
| 6,511,534 B1 | 1/2003 | Mishina et al. | 106/31.33 |
| 6,552,156 B2 | 4/2003 | Noguchi et al. | 528/71 |
| 6,676,254 B2 | 1/2004 | Nagashima et al. | 347/100 |
| 6,698,876 B2 | 3/2004 | Sato et al. | 347/100 |
| 6,706,105 B2 | 3/2004 | Takada et al. | 106/31.6 |
| 6,723,137 B1 | 4/2004 | Hakamada et al. | 8/549 |
| 6,730,155 B2 | 5/2004 | Gotoh et al. | 106/31.86 |
| 6,830,329 B2 | 12/2004 | Iwata | 347/105 |
| 6,857,733 B2* | 2/2005 | Issler | 347/100 |
| 6,874,881 B2 | 4/2005 | Suzuki et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,005,461 B2 | 2/2006 | Sanada et al. | 523/160 |
| 7,029,109 B2 | 4/2006 | Shirota et al. | 347/100 |
| 7,055,943 B2 | 6/2006 | Suzuki et al. | 347/100 |
| 7,128,779 B2 | 10/2006 | Osumi et al. | 106/31.52 |
| 7,141,105 B2 | 11/2006 | Udagawa et al. | 106/31.49 |
| 7,144,449 B2 | 12/2006 | Udagawa et al. | 106/31.15 |
| 7,160,376 B2 | 1/2007 | Watanabe et al. | 106/31.6 |
| 7,276,110 B2 | 10/2007 | Tsujimura et al. | 106/31.27 |
| 7,347,890 B2* | 3/2008 | Nito et al. | 106/31.27 |
| 7,442,244 B2 | 10/2008 | Ishihara | 106/31.58 |
| 2002/0096085 A1 | 7/2002 | Gotoh et al. | 106/31.86 |
| 2004/0020407 A1* | 2/2004 | Kato | 347/100 |
| 2004/0027404 A1 | 2/2004 | Nagashima et al. | 347/8 |
| 2004/0182282 A1 | 9/2004 | Yamazaki et al. | 106/31.86 |
| 2005/0005818 A1 | 1/2005 | Sato et al. | 106/31.27 |
| 2005/0024458 A1 | 2/2005 | Sanada et al. | 347/100 |
| 2005/0088501 A1 | 4/2005 | Nagashima et al. | 347/100 |
| 2005/0136208 A1 | 6/2005 | Iwata et al. | 428/41.8 |
| 2005/0195243 A1 | 9/2005 | Nagashima et al. | 347/54 |
| 2005/0204955 A1 | 9/2005 | Nagashima et al. | 106/31.59 |
| 2005/0219341 A1 | 10/2005 | Nito et al. | 347/100 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0066699 A1 | 3/2006 | Tokuda et al. | 347/100 |
| 2006/0089424 A1 | 4/2006 | Sanada et al. | 523/160 |
| 2006/0098067 A1 | 5/2006 | Imai et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 | 5/2006 | Hakamada et al. | 347/100 |
| 2006/0125895 A1 | 6/2006 | Nito et al. | 347/100 |
| 2006/0125896 A1 | 6/2006 | Aikawa et al. | 347/100 |
| 2006/0135647 A1 | 6/2006 | Ichinose et al. | 523/160 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osumi et al. | 347/100 |
| 2006/0142417 A1 | 6/2006 | Kaneko et al. | 523/160 |
| 2006/0152570 A1 | 7/2006 | Ishikawa et al. | 347/105 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |
| 2006/0196389 A1 | 9/2006 | Tsuji et al. | 106/31.43 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| EP | 1 156 086 A1 | 11/2001 |
| EP | 1 577 353 A1 | 9/2005 |
| JP | 2000-063719 | 2/2000 |
| JP | 2000-198955 | 7/2000 |
| JP | 2001-11348 | 1/2001 |
| JP | 2004-107631 | 4/2004 |
| JP | 2005-206615 | 8/2005 |
| WO | WO 01/40390 A1 | 6/2001 |
| WO | WO 01/51566 A1 | 7/2001 |

OTHER PUBLICATIONS

Oct. 11, 2005 International Search Report and Written Opinion in International Application No. PCT/JP2005/012277.

Sep. 19, 2007 European Search Report in European Patent Application No. 05755744.9.

* cited by examiner

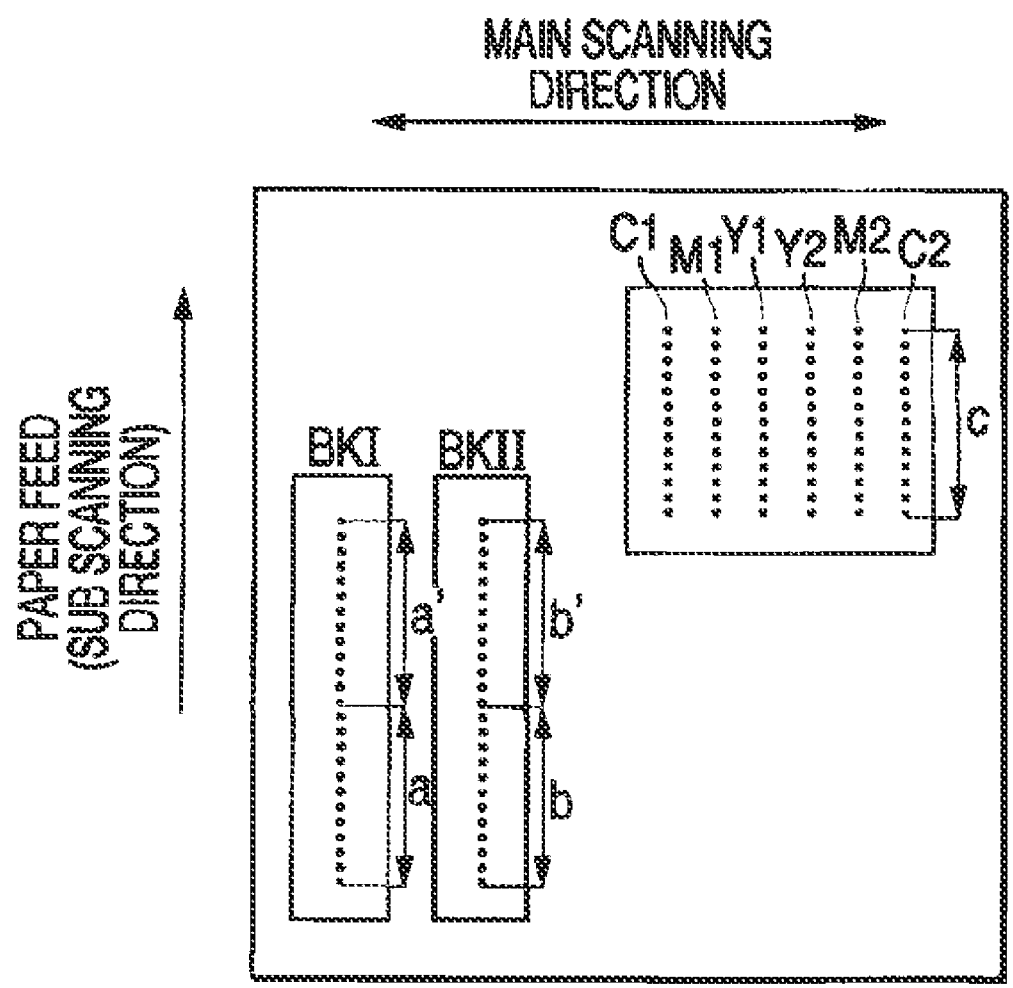

AQUEOUS INK, AQUEOUS INK SET, INK CARTRIDGE, INK-JET RECORDING APPARATUS, INK-JET RECORDING METHOD, AND IMAGE-FORMING METHOD

This application is a division of application Ser. No. 11/313,689 filed Dec. 22, 2005 now abandoned, which is a continuation of International Application No. PCT/JP2005/012277, filed Jun. 28, 2005, which claims the benefit of Japanese Patent Application Nos. 2004-190555 filed Jun. 28, 2004, and 2004-190573 filed Jun. 28, 2004.

BACKGROUND OF THE INVENTION

1. Field of the Invention

The present invention relates to an aqueous ink and an aqueous ink set each containing a water-insoluble coloring material. More specifically, the present invention relates to a recording method and a recording apparatus each using an ink-jet recording system; and an aqueous ink suitable for an image-forming method.

2. Related Background Art

Ink containing, as a coloring agent, a water-insoluble coloring material such as a pigment (pigment ink) has been conventionally known to provide an image excellent in fastness properties such as water resistance and light resistance. Various techniques have been recently proposed for the purpose of increasing the image density of an image formed by means of such ink.

For example, there has been proposed the use of an ink containing self-dispersion carbon black and a specific salt to achieve an additional increase in image density (see, for example, JP-A-No. 2000-198955). A technique has also been proposed, which involves: causing an ink-jet recording ink, which is a composition containing a pigment, polymer fine particles, a water-soluble organic solvent, and water, and a polyvalent-metal-salt-containing aqueous solution to adhere to a recording medium; and causing the ink composition and the polyvalent-metal-salt-containing aqueous solution to react with each other to form a high-quality image (see, for example, JP-A-No. 2000-063719). In each of those techniques, a pigment present in ink in a dispersed state is forcedly flocculated at the surface of a recording medium to suppress the permeation of the pigment into the recording medium, thereby obtaining an image with an increased density.

SUMMARY OF THE INVENTION

The investigation by the inventors of the present invention has revealed that in each of the above techniques, the area by which the surface of a recording medium can be covered with a coloring material as compared to the volume of an ink droplet (so-called an area factor) is insufficient because pigment particles are flocculated on the recording medium. This finding means that each of the above techniques requires an increased amount of ink to be applied as compared to that of conventional pigment ink obtained by dispersing a pigment by means of a polymer dispersant or the like for obtaining the same image density, and each of the above techniques is susceptible to improvement in this respect. There exist a large number of methods of obtaining a large area factor even with an ink droplet having a small volume by improving the permeability of ink into a recording medium. However, when the permeability of ink is improved, the ink permeates into not only the surface of a recording medium but also the depth direction of the recording medium, so a sufficient image density may not be obtained.

The inventors of the present invention have sought the advantages and disadvantages of the respective conventional inks and analyzed the characteristics of an image itself. As a result, they have revealed that, when a coloring material is present in ink in a high concentration, a large amount of excessive coloring material is present on the surface of a recording medium, or dots having visually different shapes are formed, and that a waste coloring material not involved in color development is present in the recording medium.

The inventors of the present invention have found that an image superior to a conventional one can be formed by solving at least one of the above technical problems. The present invention solves at least one of the following problems found by the inventors of the present invention.

(1) A problem in which, when a pigment present in ink in a dispersed state is forcedly flocculated at the surface of a recording medium, an area by which the surface of the recording medium can be covered with a coloring material as compared to the volume of an ink droplet (so-called an area factor) may not be sufficient, so the amount of ink to be applied necessary for obtaining the same image density increases.

(2) A problem in which, when the permeability of ink is improved, the ink permeates into not only the surface of a recording medium but also the depth direction of the recording medium, so a coloring material cannot be distributed in a high concentration near the surface of the recording medium, and hence a high image density cannot be achieved.

In view of the above problems, the inventors of the present invention have made various studies on ink capable of effectively suppressing color mixing (bleeding) at a boundary between regions of respective colors when a color image having a high image density and regions, which are different from each other in color, adjacent to each other is recorded on plain paper such as copy paper or recycled paper to be used as a recording medium. As a result, they have found that the above problems can be solved by utilizing the properties of a water-insoluble coloring material and a water-soluble organic solvent in ink.

The inventors of the present invention have made additional studies. As a result, they have found that, when aqueous ink having such properties as described above is used for an image-forming method which includes the step of applying a reaction liquid capable of making the state of dissolution or dispersion of a water-insoluble coloring material in an aqueous ink unstable on contact with the aqueous ink, to form an image on a recording medium such as plain paper, the image has a sufficiently large area factor even with a small amount of ink droplets and has a high image density, and the use of the aqueous ink has a significant improving effect on fixability which is evaluated as indications of image deterioration and contamination of a non-printed portion when a finger or the like is in contact with a printed portion.

Meanwhile, the inventors have found a new problem in that, when ink having such properties as described above is used to form an image on a recording medium having surface gloss (glossy recording medium), the image may have reduced gloss as compared to that of conventional ink depending on the kind of the recording medium.

In view of the above, the inventors of the present invention have made various studies to provide aqueous ink which can achieve both of image properties requested for an image to be formed on plain paper (a high image density, good bleeding resistance, and excellent fixability) and image properties requested for an image to be formed on a glossy recording medium having surface gloss (high gloss); and is excellent in storage stability. As a result, they have found that, depending on the properties of a water-insoluble coloring material and a water-soluble organic solvent in ink, the rate of flocculation of the water-insoluble coloring material and the formed state of an flocculate after the application of the ink to a recording medium tend to vary completely.

Accordingly, an object of the present invention is to provide an aqueous ink to be used for an image-forming method including the step of applying a reaction liquid capable of making the state of dissolution or dispersion of a water-insoluble coloring material in an aqueous ink unstable on contact with the aqueous ink (which may hereinafter be referred to as a two-liquid system), the aqueous ink having a sufficiently large area factor even with a small amount of ink droplets, being capable of providing an image excellent in image density, bleeding resistance and fixability, and having excellent storage stability.

Another object of the present invention is to provide an aqueous ink set which can achieve both performance requested when plain paper is used as a recording medium (such as an image density, bleeding resistance, or fixability) and performance requested when a recording medium having surface gloss is used (such as gloss) by selecting aqueous ink to be used for forming an image in accordance with a kind of recording medium.

Another object of the present invention is to provide an ink-jet recording method, an ink cartridge, and an ink-jet recording apparatus each using the aqueous ink or aqueous ink set having the above constitution.

Another object of the present invention is to provide an image-forming method capable of effectively suppressing color mixing (bleeding) at a boundary between images of different colors when a color image having regions, which are different from each other in color, adjacent to each other is recorded on plain paper.

The above objects are achieved by the present invention described below. That is, according to one aspect of the present invention, there is provided an aqueous ink to be used for an image-forming method including the step of applying a reaction liquid capable of making the state of dissolution or dispersion of a water-insoluble coloring material in an aqueous ink unstable on contact with the aqueous ink, in which the aqueous ink comprises at least: water; a water-insoluble coloring material; and plurality of water-soluble organic solvents, and the plurality of the water-soluble organic solvents includes a good medium or good mediums for the water-insoluble coloring material and a poor medium or poor mediums for the water-insoluble coloring material, and the aqueous ink being characterized in that: the ratio B/A is 0.5 or more and 3 or less, where A denotes the total content (mass %) of the good medium based on the total mass of the aqueous ink and B denotes the total content (mass %) of the poor medium based on the total mass of the aqueous ink, and a water-soluble organic solvent showing the maximum Ka value out of respective Ka values of the plurality of water-soluble organic solvents as each determined by the Bristow method is the poor medium.

According to another aspect of the present invention, there is provided an aqueous ink set to be used for an image-forming method that may include as required the step of applying a reaction liquid capable of making the state of dissolution or dispersion of a water-insoluble coloring material in an aqueous ink unstable on contact with aqueous ink, and the aqueous ink set comprising at least two kinds of aqueous inks having the same hue, and the at least two kinds of aqueous inks including at least a first aqueous ink and a second aqueous ink, and the aqueous ink set being characterized in that: the first aqueous ink is used in combination with a reaction liquid only when the step of applying the reaction liquid is performed; and in which the first aqueous ink comprises water, a water-insoluble coloring material, and plurality of water-soluble organic solvents, and the plurality of the water-insoluble organic solvents including a good medium or good mediums for the water-insoluble coloring material and a poor medium or poor mediums for the water-insoluble coloring material; and, in which the ratio B/A in the first aqueous ink being more than the ratio B/A in the second aqueous ink, where A denotes the total content (mass %) of a good medium based on the total mass of each aqueous ink and B denotes the total content (mass %) of a poor medium based on the total mass of the aqueous ink.

According to another aspect of the present invention, there is provided an ink-jet recording method including the step of ejecting ink by means of an ink-jet method, characterized in that: the ink is aqueous ink having the above constitution; and the ink-jet recording method may further include the step of applying a reaction liquid to a recording medium in accordance with a recording condition.

According to another aspect of the present invention, there is provided an image-forming method including the steps of: (i) applying an aqueous ink comprising a water-insoluble coloring material to a recording medium; and (ii) applying a reaction liquid capable of making the state of dissolution or dispersion of a water-insoluble coloring material in an aqueous ink unstable on contact with the aqueous ink, the image-forming method being characterized in that: the aqueous ink is an aqueous ink having the above constitution; and in which the step (i) is performed after fixation of the reaction liquid to the recording medium in the step (ii) has been completed.

According to another aspect of the present invention, there is provided an image-forming method including the steps of: performing recording on a recording medium by means of a black ink and at least one color ink according to an ink-jet recording method; and applying, as required, a reaction liquid capable of making the state of dissolution or dispersion of a water-insoluble coloring material in an aqueous ink unstable on contact with an ink comprising a water-insoluble coloring material, and the image-forming method being characterized in that: the aqueous ink having the above constitution is used as the black ink; and, in which in forming an image composed of an image formed by the black ink and an image formed by the color ink are adjacent to each other, performing scanning for applying the black ink to form the image and thereafter performing scanning for applying the color ink to the area where the image has been formed by the precedent scanning.

According to another aspect of the present invention, there is provided an aqueous ink set to be used for an image-forming method that may include as required the step of applying a reaction liquid capable of making the state of dissolution or dispersion of a water-insoluble coloring material in an aqueous ink unstable on contact with an aqueous ink comprising a water-insoluble coloring material, and the aqueous ink set containing at least two kinds of aqueous inks having the same hue, and the at least two kinds of aqueous inks including a first aqueous ink and a second aqueous ink, and the aqueous ink set being characterized in that: the first aqueous ink is used in combination with a reaction liquid only when the step of applying the reaction liquid is performed; and the second aqueous ink is used at least when the step of applying the reaction liquid is not performed; and in which the first aqueous ink comprises water, a water-insoluble coloring material, and plurality of water-soluble organic solvents, and the plurality of water-soluble organic solvents including a good medium or good mediums for the water-insoluble coloring material and a poor medium or poor mediums for the water-insoluble coloring material; and in which a water-soluble organic solvent showing the maximum Ka value out of respective Ka values of the plurality of water-soluble organic solvents as each determined by the Bristow method is the poor medium; and in which the poor medium permeates into a recording medium ahead of the good medium and the poor medium promotes the flocculation of the water-insoluble coloring material in the good medium on a surface side of the recording medium.

According to the present invention, there can be provided an aqueous ink to be used for an image-forming method including the step of applying a reaction liquid capable of making the state of dissolution or dispersion of a water-insoluble coloring material in an aqueous ink unstable on contact with an aqueous ink comprising a water-insoluble coloring material (two-liquid system), the aqueous ink having a sufficiently large area factor even with a small amount of ink droplets, being capable of providing an image excellent in image density; and having excellent storage stability. According to another embodiment of the present invention, there can be provided an aqueous ink set which can achieve both performance requested when plain paper is used as a recording medium (such as bleeding resistance or a high image density) and performance requested when a recording medium having surface gloss is used (such as gloss) by selecting aqueous ink to be used for forming an image in accordance with a kind of recording medium. According to another embodiment of the present invention, there can be provided an ink-jet recording method, an ink cartridge, and an ink-jet recording apparatus each using the aqueous ink or aqueous ink set having the above constitution. According to another embodiment of the present invention, there can be provided an image-forming method capable of effectively suppressing color mixing (bleeding) at a boundary between images of different colors when a color image having regions, which are different from each other in color, adjacent to each other is recorded on plain paper.

BRIEF DESCRIPTION OF THE DRAWINGS

FIG. 9 is a view showing an example of the constitution of a recording head.

Figure 1:
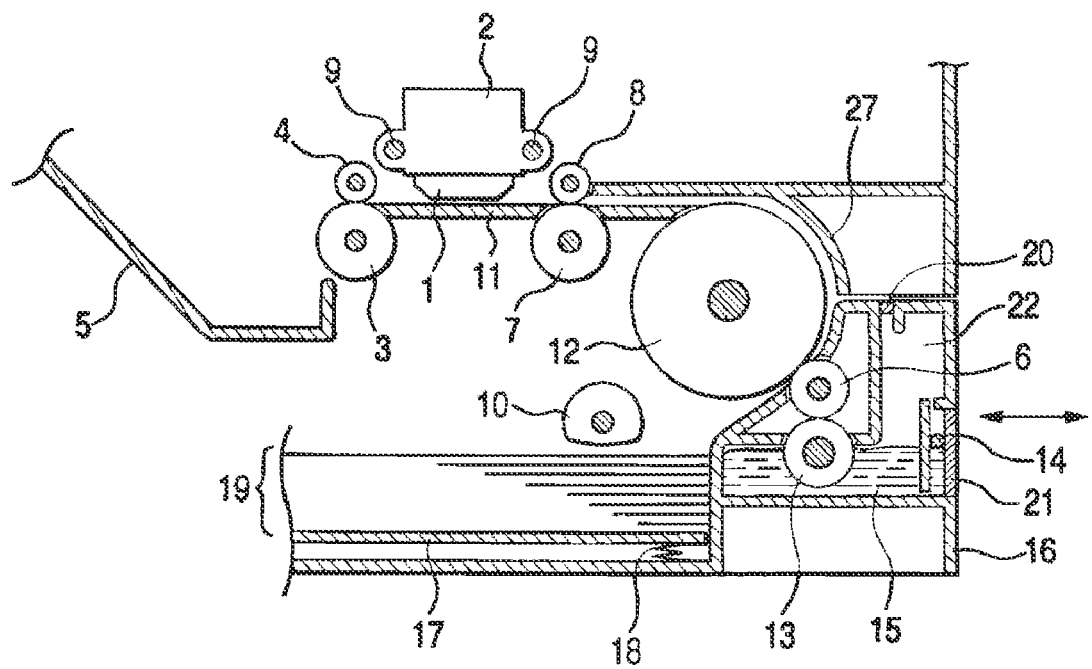
FIG. 1 is a schematic side sectional view showing an example of a recording apparatus.

Reference numerals in the figures denote the following members.

| | |
|---|---|
| 1: | recording head |
| 2: | carriage |
| 3: | sheet-discharge roller |
| 4: | spur |
| 5: | sheet-feeding tray |
| 6: | applying roller |
| 7: | main conveying roller |
| 8: | pinch roller |
| 9: | guide shaft |
| 10: | sheet-feeding roller |
| 11: | platen |
| 12: | intermediate roller |
| 13: | supply roller |
| 14: | float |
| 15: | reaction liquid |
| 16: | sheet-feeding cassette |
| 17: | sheet-feeding tray |
| 18: | spring |
| 19: | recording medium (recording paper) |
| 20: | inlet |
| 21: | remaining amount display window |
| 22: | supply tank |
| 23: | injector |
| 27: | paper guide |
| 1300: | recording medium |
| 1301: | ink droplet |
| 1302: | outer periphery of dot |
| 1303: | center portion of dot |
| 1304: | water-insoluble coloring material |
| 1305: | dot |
| 1306: | water-soluble organic solvents and water |
| 1307: | poor medium |

DESCRIPTION OF THE PREFERRED EMBODIMENTS

Hereinafter, the present invention will be described in more detail by way of the best mode for carrying out the invention.

First, a poor medium and a good medium in the present invention will be described. Details about the definition of each of the poor medium and good medium will be described later. A water-soluble organic solvent into which a water-insoluble coloring material to be used as a coloring material is dispersed with good stability is defined as a good medium, and a water-soluble organic solvent into which the water-insoluble coloring material is dispersed with bad stability is defined as a poor medium irrespective of a method of dispersing the water-insoluble coloring material.

The aqueous ink according to the present invention is further characterized in that when paying attention to water-soluble organic solvents to be incorporated into the aqueous ink together with a water-insoluble coloring material; the water-soluble organic solvents each having a function of dissolving or dispersing the water-insoluble coloring material are classified into one showing behavior as the poor medium for the water-insoluble coloring material and one showing behavior as the good medium for thereto; and the ratio of the poor medium to the good medium in the aqueous ink is adjusted to fall within a specific range to design the ink. With such constitution, an aqueous ink capable of forming, even on plain paper that has conventionally involved various problems in image formation by means of aqueous ink, an image which has effectively suppressed bleeding; a sufficiently large area factor even with a small amount of ink droplets; and a high image density. Furthermore, when the aqueous ink having the above constitution is applied to a two-liquid system, performance requested for an image on plain paper such as an image density, bleeding resistance, and fixability can be significantly improved as compared to conventional ink composition. In particular, as the ratio of the content of a poor medium to the content of a water-insoluble coloring material in aqueous ink increases, the rate of flocculation of the coloring material on a recording medium is promoted, so a significant improving effect on fixability appears.

When the aqueous ink having the above constitution is applied to a two-liquid system, attention must be paid to the need that the ink should be applied to a recording medium after the completion of the fixation of a reaction liquid to the recording medium. The reason for this is as follows. When the reaction liquid and the ink in liquid states are in contact with each other on the recording medium as in a conventional two-liquid system, an area by which the surface of the recording medium can be covered with a coloring material as compared to the volume of an ink droplet (so-called an area factor) may not be sufficient, or fixability may reduce to some degree depending on the reactivity between the ink and the reaction liquid.

However, when an ink is used alone to form an image on a recording medium having surface gloss, that is, a glossy recording medium, the gloss of the image may be lost depending on the ratio of the poor medium to the good medium in the ink and the kind of the recording medium.

This is probably because such phenomenon as describe below occurs. A poor medium for a water-insoluble coloring material in ink promotes an flocculation reaction of the water-insoluble coloring material on a recording medium. As a result, the water-insoluble coloring material abruptly flocculates, so the irregularities of an image portion generated by the flocculation of the water-insoluble coloring material are highly remarkable. As a result, light is irregularly reflected to reduce gloss.

The inventors of the present invention have observed the flocculated state of water-insoluble coloring materials in an image with an electron microscope, the image being formed by applying, to a glossy recording medium having surface gloss (such as a Professional photopaper PR-101; manufactured by CANON Inc.), several kinds of aqueous inks with their contents of the water-insoluble coloring materials and good mediums kept constant and their contents of poor mediums changed. As a result, they have confirmed that the flocculate to be formed on the recording medium becomes bulky as the content of a poor medium in an aqueous ink is increased.

On the basis of the foregoing, the inventors of the present invention have considered that there is a certain relationship between a poor medium in ink and the rate of flocculation of a water-insoluble coloring material on a recording medium, the relationship contributing to the gloss of an image formed on the recording medium, and they have made studies. As a result, they have found that excellent gloss can be obtained by increasing the content of good medium in ink to be used for a recording medium such as a recording medium having surface gloss (glossy recording medium) on which recording is performed without application of a reaction liquid to be higher than that in ink to be used for a recording medium to which a reaction liquid has been applied to reduce the rate of flocculation of a water-insoluble coloring material on the recording medium.

In view of the above, the inventors of the present invention have found that both performance requested when plain paper is used as a recording medium (such as bleeding resistance or an image density) and performance requested when a recording medium having surface gloss is used (such as gloss) can be achieved by using an aqueous ink set containing multiple aqueous inks having the same hue and different properties; and selecting an aqueous ink to be used for forming an image in accordance with a kind of recording medium, thereby completing the present invention.

[Mechanism of Image Formation]

Here, an example of a mechanism of image formation in the present invention will be described. The aqueous ink according to the present invention is expected to provide a very excellent image density and very excellent printing quality by the reason of the following when the ink is printed on a recording medium, especially plain paper.

Figure 10A:
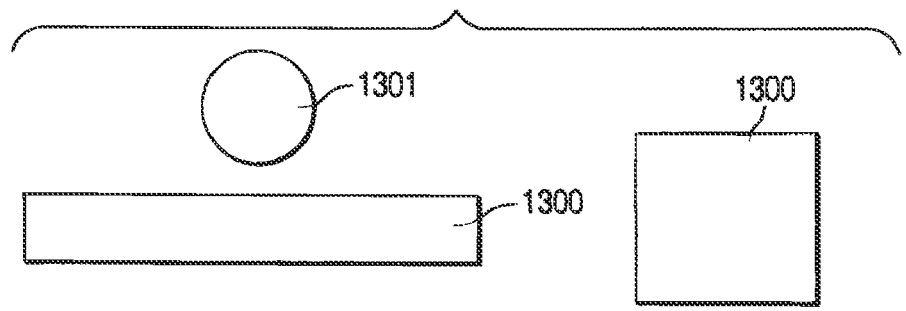
FIGS. 10A, 10B, 10C, and 10D are views for schematically explaining a state where a droplet of an ink according to the present invention impacts on the surface of a recording medium.

That is, as shown in FIG. 10A, when an ink droplet 1301 according to the present invention is printed on a recording medium 1300 such as plain paper, the ratios of the good medium, the poor medium, and the pigment to the water and the pigment in the ink start to change at the time when the ink impacts on the recording medium. In other words, as shown in FIGS. 10A and 10B, after the ink droplet 1301 has impacted on the surface of the recording medium 1300, as the ink is fixed to the recording medium, a poor medium 1307 having the maximum Ka value out of the water-soluble organic solvents in the ink over good medium having a lower Ka value scatters in a nearly complete circle form at a position nearer the surface of the recording medium with the evaporation of water, so an ink dot is expected to be formed.

Figure 10B:
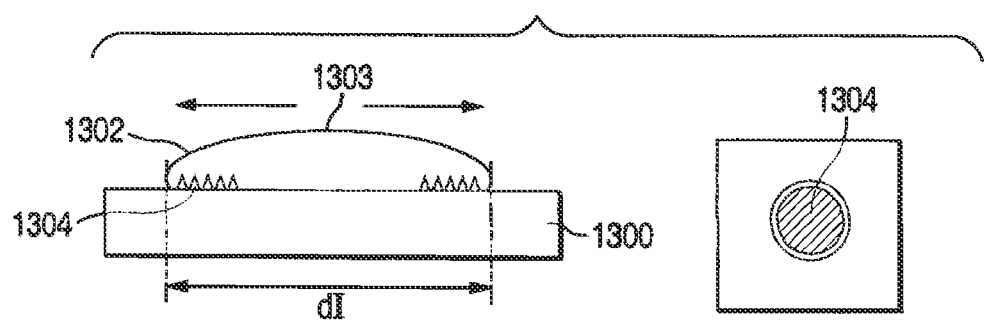
Figure 10C:
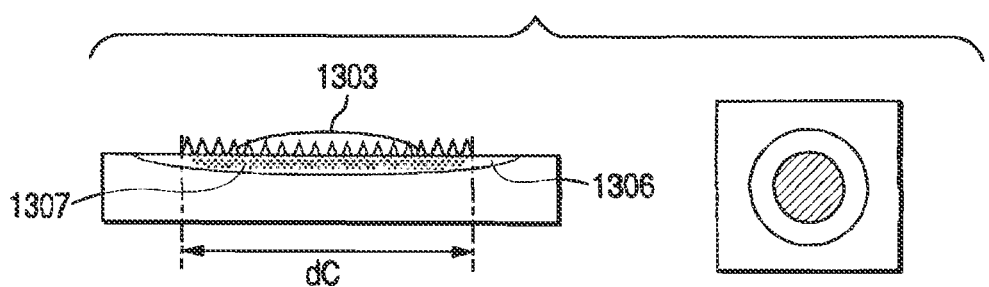
Figure 10D:
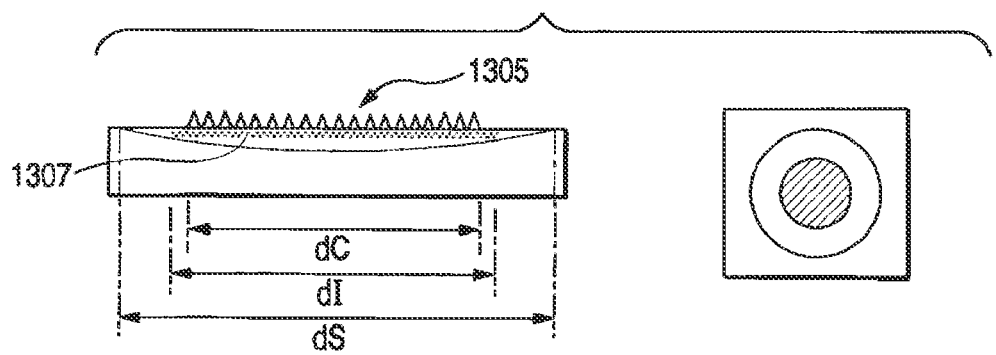

FIGS. 10B, 10C, and 10D are schematic views showing the state of ink during the period from the impact of the ink on the recording medium 1300 to the end of the fixation of the ink. Paying attention to the state of spreading of an ink dot in this case allows one to consider that the concentration of a poor medium is higher at an outer periphery 1302 of the dot at a portion of contact between the ink and the paper than at a center portion 1303 of the dot. As a result, the ink dot scatters in a nearly complete circle form near the surface of the recording medium, and the concentration of the poor medium 1307 for the water-insoluble coloring material suddenly increases in the course of the scattering. The sudden increase involves the destabilization of the dispersion of the water-insoluble coloring material to cause the flocculation or dispersion destruction of the water-insoluble coloring material. At this time, the ink dot scatters while taking an edge close to a complete circle form on the surface of the recording medium (see FIG. 10B), and a water-insoluble coloring material 1304 remains on the surface of the recording medium 1300 as if a bank of the water-insoluble coloring material were formed at the outer edge portion of the dot. Thus, the dot of the water-insoluble coloring material is expected to be formed in a complete circle form and fixed in this state on the surface of the recording medium (see FIG. 10C). At this time, the formation of the dot of the water-insoluble coloring material is completed, but the water-soluble organic solvents and water 1306 in the ink spread radially while scattering. In other words, even after the formation of the dot of the water-insoluble coloring material, the water-soluble organic solvents and the water 1306 continue to scatter near the surface of the recording medium. Subsequently, the evaporation or permeation of the water-soluble organic solvent at the good medium-rich center portion 1303 causes the water-insoluble coloring material to precipitate at the portion to form a dot 1305 (see FIG. 10C). An image formed through such a process as described above has a sufficiently large area factor even with a small amount of ink droplets, has a high image density, and is of high quality.

The reason for which an increased image density and excellent image fixability are obtained by applying ink based on the above idea after applying a reaction liquid will be schematically explained with reference to FIGS. 12A and 12B.

Figure 12A:
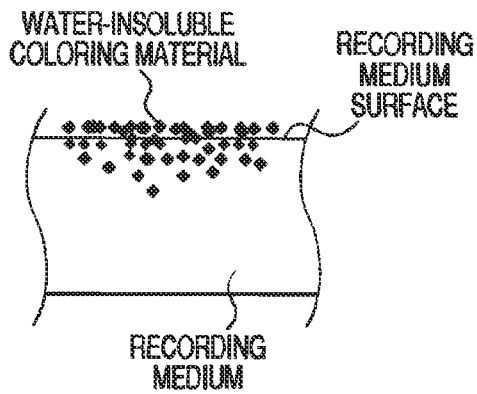
FIGS. 12A and 12B are views for explaining the behavior of a pigment on the surface of a recording medium.
Figure 12B:
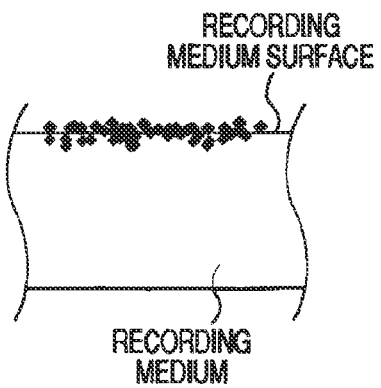

FIG. 12A schematically represents how a coloring material is fixed when ink is applied without application of a reaction liquid, while FIG. 12B schematically represents how a coloring material is fixed when ink is applied after the application of a reaction liquid. The application of the reaction liquid causes the coloring material to be present on paper in an increased amount and in an additionally flocculated state. In other words, an increased coloring material concentration and improved fixability are obtained. In FIG. 12B, the reaction liquid is applied and the ink is applied after the reaction liquid has been fixed, so the coloring material permeates into paper to some extent. Therefore, a sufficient area factor can be obtained with a smaller amount of ink to be applied than in the case where the coloring material flocculates only on paper.

[Method of Determining Good Medium and Poor Medium]

The good medium and the poor medium to be used in the present invention under such assumed mechanism as described above are determined on the basis of whether the dispersed state of a water-insoluble coloring material can be favorably maintained, that is, a relation with the water-insoluble coloring material or a dispersant therefor. Accordingly, in preparing the ink according to the present invention, the good medium and the poor medium are preferably selected on the basis of the observation of the degree of stability of the dispersed state of a water-insoluble coloring material to be used. The inventors of the present invention have found that the following determination method is effective as a result of various studies of the criteria for determination of the good medium and the poor medium providing the effects of the present invention in connection with the effects of the present invention.

First, a dispersion solution of the water-insoluble coloring material is prepared which contains 50 mass % of each water-soluble organic solvent to be determined, 45 mass % of water, and 5 mass % of the water-insoluble coloring material to be used for the ink. Then, the prepared dispersion solution is stored at 60° C. for 48 hours. The water-soluble organic solvent is regarded as a poor medium when the average particle size of the water-insoluble coloring material in the liquid is larger than the average particle size of the water-insoluble coloring material in a water dispersion solution containing 5 mass % of the water-insoluble coloring material and 95 mass % of water. The water-soluble organic solvent is regarded as a good medium when the average particle size of the water-insoluble coloring material in the dispersion solution is equal to or smaller than that of the water-insoluble coloring material in the water dispersion solution containing 5 mass % of the water-insoluble coloring material and 95 mass % of water.

More specifically, determination as to whether a water-soluble organic solvent to be used is a good medium or a poor medium for a certain water-insoluble coloring material is made according to the following method. First, two kinds of dispersion solutions shown below are prepared: a dispersion solution A of a water-insoluble coloring material in a solvent containing the water-soluble organic solvent to be determined, and a water dispersion solution B of the same water-insoluble coloring material.

Dispersion solution A: A water-insoluble coloring material dispersion solution containing 50 mass % of a water-soluble organic solvent to be determined, 5 mass % of a water-insoluble coloring material (or 5 mass % in total of a water-insoluble coloring material and a substance contributing to the dispersion of the coloring material), and 45 mass % of water.

Water dispersion solution B: A water dispersion solution of a water-insoluble coloring material containing 5 mass % of the water-insoluble coloring material (or 5 mass % in total of the water-insoluble coloring material and a substance contributing to the dispersion of the coloring material), and 95 mass % of water.

The dispersion solution A is kept at 60° C. for 48 hours, and cooled to ordinary temperature. The average particle size of the water-insoluble coloring material in the dispersion solution A is measured with a fiber-optics particle analyzer (trade name: FPAR-1000; manufactured by Otsuka Electronics Co., Ltd.) or the like. Meanwhile, the average particle size of the water-insoluble coloring material in the water dispersion solution B that has not been stored under heat is measured with the fiber-optics particle analyzer in the same manner as that described above. The water-soluble organic solvent to be determined is determined to be a good medium or a poor medium in accordance with the following definition by means of the particle size (A) and particle size (B) of the water-insoluble coloring materials in the dispersion solution A and the water dispersion solution B, respectively.

Poor medium: When the particle size (A) is larger than the particle size (B) in the foregoing, the water-soluble organic solvent to be determined is defined as a poor medium.

Good medium: When the particle size (A) is equal to or smaller than the particle size (B), the water-soluble organic solvent to be determined is defined as a good medium.

The preparation of ink having the constitution of the present invention by means of the determined good and poor mediums as described above has been confirmed to provide such excellent effects as described above.

[Ka Value of Water-Soluble Organic Solvent]

In the present invention, a water-soluble organic solvent showing the maximum Ka value out of respective Ka values of plurality of water-soluble organic solvents of different kinds in a first aqueous ink must be a poor medium.

Here, a Ka value determined by the Bristow method will be described. The value is used as an indication for the permeability of a liquid into a recording medium. Hereinafter, ink will be described as an example. That is, when the permeability of ink is represented by the amount V of the ink per 1 $m^2$, the amount of permeation V of the ink into a recording medium (mL/$m^2$=μm) after a predetermined time t from the ejection of an ink droplet is represented by Bristow's equation (Equation (1)) shown below.

$$V = Vr + Ka(t - t_w)^{1/2} \qquad \text{Eq. (1)}$$

Immediately after ink has been applied to a recording medium, most of the ink is absorbed by irregularities on the surface of the recording medium (surface roughness portion on the surface of the recording medium), and nearly no ink permeates into the recording medium (depth direction). The time required for the absorption is a contact time ($t_w$), and the amount of the ink absorbed by the surface roughness portion of the recording medium during the contact time is denoted by Vr. Then, after the ink has been applied to the recording medium, an amount of the ink in proportion to the square root of the time exceeding the contact time, that is, $(t-t_w)$, permeates into the recording medium (depth direction) to thereby increase the amount of permeation. Ka represents a proportionality factor of the increase, and shows a value in accordance with the rate of permeation. The Ka value can be measured by means of, for example, a dynamic permeability tester for a liquid according to the Bristow method (for example, trade name: Dynamic Permeability Tester S; manufactured by Toyo Seiki Seisaku-Sho, Ltd.).

The Ka value according to the Bristow method in the present invention is a value measured by means of plain paper (for example, PB paper (manufactured by CANON Inc.) to be used for a copying machine utilizing an electrophotographic system, a page printer (laser beam printer), or a printer utilizing an ink-jet recording system, or PPC paper for a copying machine utilizing an electrophotographic system) as a recording medium. The assumed measurement environment is an ordinary office environment such as an environment having a temperature of 20° C. to 25° C. and a humidity of 40% to 60%.

Aqueous Ink

<Aqueous Ink to be Used for Two-Liquid System>

As described above, an aqueous ink according to the preferred embodiment of present invention in which a quantitative relationship between a good medium or good mediums and a poor medium or poor mediums for a water-insoluble coloring material is specified in a specific range is characterized by being applicable to a two-liquid system. In addition, it is preferable that the aqueous ink contains at least water, a water-insoluble coloring material, and plurality of water-soluble organic solvents including a good medium or good mediums for the water-insoluble coloring material and a poor medium or poor mediums for the water-insoluble coloring material; and the kinds and contents of the water-soluble organic solvents constituting the aqueous ink be adjusted in such a manner that, the ratio B/A is 0.5 or more and 3 or less, where A denotes the total content (mass %) of the good medium based on the total mass of the aqueous ink and B denotes the total content (mass %) of the poor medium based on the total mass of the aqueous ink, and that a water-soluble organic solvent showing the maximum Ka value out of respective Ka values of the plurality of water-soluble organic solvents as each determined by the Bristow method is the poor medium.

As a result, the aqueous ink can have a sufficiently large area factor even with a small amount of ink droplets, provide an image having a high image density to be formed on a recording medium (especially, plain paper or the like), and is excellent in storage stability, because the dispersed state of the water-insoluble coloring material is stabilized. When such aqueous ink as described above is used to form an image on a recording medium to which a reaction liquid has been applied, bleeding resistance, an image density, fixability, and the like can be significantly improved as compared to a conventional two-liquid system.

Furthermore, in the aqueous ink according to the present invention, the total content (mass %) of the poor medium is preferably 4 mass % or more based on the total mass of the aqueous ink, or the total content (mass %) of the poor medium is equal to or more than the content (mass %) of the solid content in the water-insoluble coloring material because the effects of the present invention can be effectively obtained.

<Aqueous Ink to be Incorporated into Aqueous Ink Set>

A aqueous ink set according to another embodiment of the present invention is characterized in that aqueous ink to be used for forming an image is selected in accordance with a kind of recording medium. Furthermore, it is preferable that the aqueous ink set comprises at least two kinds of aqueous inks having the same hue and including a first aqueous ink and a second aqueous ink; and the first aqueous ink be used in combination with a reaction liquid only when the step of applying the reaction liquid is performed; and the first aqueous ink comprises at least water, a water-insoluble coloring material, and plurality of water-soluble organic solvents, and the plurality of water-soluble organic solvents including a good medium or good mediums for the water-insoluble coloring material and a poor medium and poor mediums for the water-insoluble coloring material; and the kinds and contents of the water-soluble organic solvents constituting the aqueous ink be adjusted in such a manner that, the ratio B/A in the first aqueous ink being more than the ratio B/A in the second aqueous ink, where A denotes the total content (mass %) of good medium based on the total mass of each aqueous ink and B denotes the total content (mass %) of poor medium based on the total mass of the aqueous ink.

(First Aqueous Ink)

It is preferable that the first aqueous ink according to another embodiment of the present invention be used in combination with a reaction liquid only when the step of applying the reaction liquid is performed; the first aqueous ink comprises at least water, a water-insoluble coloring material, and plurality of water-soluble organic solvents, and the plurality of water-soluble organic solvents including a good medium or good mediums for the water-insoluble coloring material and a poor medium or poor mediums for the water-insoluble coloring material; and the kinds and contents of the water-soluble organic solvents constituting the first aqueous ink be adjusted in such a manner that, the ratio B/A in the first aqueous ink being more than the ratio B/A in the second aqueous ink where A denotes the total content (mass %) of a good medium based on the total mass of each aqueous ink and B denotes the total content (mass %) of a poor medium based on the total mass of the aqueous ink.

The first aqueous ink to be incorporated into the aqueous ink set may be an aqueous ink to be used for the above-described two-liquid system. In this case, when an image is formed on a recording medium (especially, plain paper or the like), an image density, bleeding resistance, fixability, and the like can be improved.

Multiple aqueous inks may be used as first aqueous inks as long as they are used in combination with a reaction liquid.

(Second Aqueous Ink)

It is preferable that the second aqueous ink according to another embodiment of the present invention be used alone without being combined with a reaction liquid, or be used in combination with the reaction liquid in accordance with a recording condition such as a kind of recording medium; the second aqueous ink comprises at least water, a water-insoluble coloring material, and a water-soluble organic solvent; and the kind and content of the water-soluble organic solvent constituting the aqueous ink be adjusted in such a manner that, the ratio B/A in the first aqueous ink to be used for the step of applying the reaction liquid being more than the ratio B/A in the second aqueous ink where A denotes the total content (mass %) of a good medium based on the total mass of each aqueous ink and B denotes the total content (mass %) of a poor medium based on the total mass of the aqueous ink.

In particular, it is preferable that B/A in the first aqueous ink be 0.5 or more and 3 or less; and B/A in the second aqueous, ink be less than 0.5. Setting B/A in the second aqueous ink to be less than 0.5 nearly completely eliminates an influence of a water-soluble organic solvent on the gloss of an image formed on a glossy recording medium. Furthermore, the second aqueous ink preferably contains only a water-soluble organic solvent to serve as a good medium for the water-insoluble coloring material in order to additionally improve the storage stability and the like of the ink. Of course, the second aqueous ink may contain a poor medium or poor mediums for the water-insoluble coloring material to the extent that the effects of the present invention are not impaired. Furthermore, the content of the water-insoluble coloring material in the second aqueous ink is preferably lower than the content of the water-insoluble coloring material in the first aqueous ink in order to achieve one of the objects of the present invention, that is, achieving both the image density of an image formed on plain paper as a recording medium and the gloss of an image formed on a glossy recording medium. The gloss of an image formed on a glossy recording medium can be additionally improved when the water-insoluble coloring material in the second aqueous ink is a resin-dispersed pigment.

The second aqueous ink must have the same hue as that of the first aqueous ink. The term "inks having the same hue" as used herein refers to, for example, a combination of cyan ink and photocyan ink; magenta ink and photomagenta ink; or black ink and gray ink. Of course, the present invention is not limited thereto. A combination of the first aqueous ink and the second aqueous ink having a substantially equal coloring material concentration is also employable.

When an image is formed on a recording medium to which a reaction liquid has been applied, the second aqueous ink may be used alone or in combination with the first aqueous ink. In addition, multiple aqueous inks may be used as second aqueous inks.

A water-soluble organic solvent in the ink components of the aqueous ink according to the present invention must have such a constitution as described above in connection with the water-insoluble coloring material to be used. The other constitution may be similar constitution as that of the conventional aqueous ink containing a water-insoluble coloring material. The respective components constituting the aqueous ink of the present invention will be described below.

<Aqueous Medium>

An aqueous medium constituting the aqueous ink according to the present invention will be described. The aqueous medium is a mixed solvent of water and a water-soluble organic solvent. In the present invention, the water-soluble organic solvents are determined to be good medium and poor medium for the water-insoluble organic solvent according to the method described above. Then, on the basis of the result of determination, water-soluble organic solvents must be selected and appropriately blended to prepare ink in such a manner that at least the good medium and poor medium are simultaneously present in the aqueous ink, and the content of each water-soluble organic solvent is in the range specified in the present invention.

Specific examples of the water-soluble organic solvents include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; N-methyl-2-pyrrolidone; 2-pyrrolidone; and 1,3-dimethyl-2-imidazolidinone. In addition, deionized water is desirably used as water.

The total content of the water-soluble organic solvents in the aqueous ink according to the present invention is not particularly limited, but is preferably in the range of 3 mass % to 50 mass % based on the total mass of the ink. In addition, the water content in the aqueous ink is preferably in the range of 50 mass % to 95 mass % based on the total mass of the ink.

In a preferred embodiment of the present invention, the kinds and contents of the water-soluble organic solvents constituting the aqueous ink and the first aqueous ink of the present invention are adjusted in such a manner that the ratio B/A in each of the inks is 0.5 or more and 3 or less (more suitably 0.5 or more and 1 or less, and particularly suitably 0.6 or more and 1 or less). In addition, the contents are preferably adjusted in such a manner that the content of a poor medium in each ink is 4 mass % or more based on the total mass of the ink. The ratio B/A in the second aqueous ink is preferably set to be less than the ratio B/A in the first aqueous ink, and the content of a water-soluble organic solvent is preferably adjusted in such a manner that the ratio B/A in the second aqueous ink is less than the lower limit of a preferable range for the ratio B/A in the first aqueous ink, that is, less than 0.5.

According to the detailed investigation by the inventors of the present invention, when the content of good medium in aqueous ink is large, the aqueous ink is excellent in storage stability, but a high image density is hardly obtained when plain paper is used as a recording medium. In addition, when the content of the good medium in the aqueous ink is small, a high image density can be obtained, but the storage stability of the aqueous ink may be insufficient.

In contrast, controlling the ratio of a poor medium to a good medium out of the water-soluble organic solvents in aqueous ink as described above allows one to achieve both the storage stability of the aqueous ink and a high image density. Furthermore, when a glossy recording medium is used as a recording medium, the gloss on the glossy recording medium can be maintained for a longer time period as the content of a poor medium in aqueous ink becomes lower. Furthermore, when plain paper is used as a recording medium, an effect that cannot be conventionally obtained, that is the realization of an image having a sufficiently large area factor even with a small amount of ink droplets, and having a high image density can be achieved by controlling a Ka value determined by the Bristow method, which is an indication for the permeability into a recording medium, in determining the respective water-soluble organic solvents to be incorporated into ink.

<Water-Insoluble Coloring Material>

The water-insoluble coloring material constituting the aqueous ink according to the present invention will be described. The water-insoluble coloring material constituting the aqueous ink of the present invention may be any one of those irrespective of how they are dispersed. Of those, a pigment is particularly preferably used. To be specific, for example, the pigment may be a pigment of so-called resin-dispersed type using a dispersant or a surfactant (resin-dispersed pigment); a pigment of surfactant-dispersed type; a microcapsule-type pigment with its dispersibility enhanced to enable the dispersion of the pigment without the use of a dispersant or the like; a pigment of so-called self-dispersion type having a hydrophilic group introduced to the surface of a pigment particle (self-dispersion pigment); or a modified pigment having an organic group containing a polymer chemically bonded to the surface of a pigment particle (polymer-bonded self-dispersion pigment). Of course, those pigments to be dispersed in different ways may be used in combination.

The water-insoluble coloring material of the present invention such as the resin-dispersed pigment, the self-dispersion pigment, or the polymer-bonded self-dispersion pigment described above is dispersed in an aqueous medium. That is, it is needless to say that the good medium and poor medium for the water-insoluble coloring material of the present invention refer to good and poor mediums for the resin-dispersed pigment, the self-dispersion pigment, the polymer-bonded self-dispersion pigment, or the like. Hereinafter, the water-insoluble coloring material that can be used in the present invention will be described.

In the present invention, the content (mass %) of the water-insoluble coloring material is preferably 0.1 mass % to 15 mass %, or particularly preferably 1 mass % to 10 mass % based on the total mass of the ink. In addition, the content (mass %) of the water-insoluble coloring material in the first aqueous ink may be equal to or different from the content (mass %) of the water-insoluble coloring material in the second aqueous ink.

(Pigment)

The pigment that can be used in the aqueous ink according to the present invention is not particularly limited, and any one of those described below can be used. Multiple kinds of pigments may be used in combination for one aqueous ink.

Carbon black is suitably used for black ink. For example, any one of furnace black, lamp black, acetylene black, and channel black can be used as carbon black. Specific examples of carbon black include commercially available products such as: Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, and Raven 1255 (manufactured by Columbian Chemicals Co.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, and Vulcan XC-72R (manufactured by Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (manufactured by Degussa Corporation); and No. 25, No. 33, No. 40, No. 47, No. 52, No. 900, No. 2300, MCF-88, MA600, MA7, MA8, and MA100 (manufactured by Mitsubishi Chemical Corporation). Carbon black newly prepared for the present invention may also be used. However, the present invention is not limited to them. Any conventionally known carbon black may be used. Magnetic fine particles made of magnetite, ferrite, or the like, titanium black, or the like may be used as the black pigment instead of carbon black.

Examples of pigment particles to be used except the black ink include various organic pigment particles. Specific examples of the organic pigments include: insoluble azo pigments such as toluidine red, toluidine maroon, Hansa yellow, benzidine yellow, and pyrazolone red; soluble azo pigments such as lithol red, helio bordeaux, pigment scarlet, and permanent red 2B; derivatives of vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; diketopyrrolopyrrole-based pigments; flavanthrone yellow; acylamide yellow; quinophthalone yellow; nickel azo yellow; copper azo methine yellow; perinone orange; anthrone orange; dianthraquinonyl red; and dioxazine violet. Of course, the present invention is not limited to them, and any other organic pigment may be used.

Further, examples of the organic pigment represented by a color index (C.I.) number that can be used in the present invention include the following.

C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185

C.I. Pigment Orange 16, 36, 43, 51, 55, 59, 61, and 71

C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272

C.I. Pigment Violet 19, 23, 29, 30, 37, 40, and 50

C.I. Pigment Blue 15, 15:1, 15:3, 15:4, 15:6, 22, 60, and 64

C.I. Pigment Green 7 and 36

C.I. Pigment Brown 23, 25, and 26

(Resin-Dispersion Pigment)

As described above, a resin-dispersion pigment using a dispersant can be used as the water-insoluble coloring material that can be used in the aqueous ink according to the present invention. In this case, a compound such as a surfactant or a resin dispersant for dispersing such a hydrophobic pigment as described above is required.

An anionic surfactant or a nonionic surfactant is a preferable surfactant. Specific examples of the anionic surfactant include a fatty acid salt, an alkyl sulfate, an alkyl benzenesulfonate, an alkyl naphthalenesulfonate, a dialkyl sulfosuccinate, an alkyl phosphate, a formalin condensate of naphthalenesulfonic acid, a polyoxyethylene alkyl sulfate, and substituted derivatives thereof. Specific examples of the nonionic surfactant include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene alkylamine, a glycerin fatty acid ester, an oxyethylene oxypropylene block polymer, and substituted derivatives thereof.

Specific examples of the resin dispersant include block copolymers, random copolymers, and graft copolymers each composed of at least two monomers (at least one of which is a hydrophilic monomer) selected from styrene and a derivative thereof; vinyl naphthalene and a derivative thereof; a fatty acid alcohol ester of α,β-ethylenically unsaturated carboxylic acid; acrylic acid and a derivative thereof; maleic acid and a derivative thereof; itaconic acid and a derivative thereof; fumaric acid and a derivative thereof; and vinyl acetate, vinyl alcohol, vinyl pyrrolidone, and acrylamide, and derivatives thereof, as well as salts of the copolymers. Furthermore, for example, a block copolymer and a random copolymer may be used in combination.

(Microcapsule-Type Pigment)

As described above, a microcapsule-type pigment obtained by coating a water-insoluble coloring material with an organic polymer or the like to prepare a microcapsule can be used as the water-insoluble coloring material that can be used in the aqueous ink according to the present invention. Examples of a method of coating a water-insoluble coloring material with an organic polymer or the like to prepare a microcapsule include a chemical production method, a physical production method, a physicochemical method, and a mechanical production method. Specific examples thereof include an interfacial polymerization method, an in-situ polymerization method, a submerged cure coating method, a coacervation (phase separation) method, a submerged drying method, a melting dispersion cooling method, an aerial suspension coating method, a spray drying method, an acid precipitation method, and a phase inversion emulsification method.

Specific examples of the organic polymer or the like to be used as a material constituting the wall membrane substance of a microcapsule include: polyamide; polyurethane; polyester; polyurea; an epoxy resin; polycarbonate; a urea resin; a melamine resin; a phenol resin; polysaccharides; gelatin; gum arabic; dextran; casein; protein; natural rubber; carboxypolymethylene; polyvinyl alcohol; polyvinyl pyrrolidone; polyvinyl acetate; polyvinyl chloride; polyvinylidene chloride; cellulose; ethylcellulose; methylcellulose; nitrocellulose; hydroxyethylcellulose; cellulose acetate; polyethylene; polystyrene; a polymer or copolymer of (meth)acrylic acid; a polymer or copolymer of (meth)acrylate; a (meth)acrylic acid-(meth)acrylate copolymer; a styrene-(meth)acrylic acid copolymer; a styrene-maleic acid copolymer; soda alginate; a fatty acid; paraffin; beeswax; water wax; hardened beef tallow; carnauba wax; and albumin. Of those, an organic polymer or the like having an anionic group such as a carboxylic group or a sulfonic group is preferable. Specific examples of a nonionic organic polymer include: polyvinyl alcohol, polyethylene glycol monomethacrylate, polypropylene glycol monomethacrylate, and methoxypolyethylene glycol monomethacrylate, and (co)polymers of them; and a cation ring-opening polymer of 2-oxazoline. A completely saponified product of polyvinyl alcohol is particularly preferable because it has low water solubility and is easily soluble in hot water but is hardly soluble in cold water.

When a phase inversion method or an acid precipitation method is used for preparing a microcapsule, an anionic organic polymer or the like is used as an organic polymer or the like constituting the wall membrane substance of the microcapsule.

The phase inversion method involves turning a composite or complex of an anionic organic polymer or the like having self dispersibility or solubility in water and a coloring material such as a self-dispersion organic pigment or self-dispersion carbon black, or a mixture of a coloring material such as a self-dispersion organic pigment or self-dispersion carbon black, a curing agent, and an anionic organic polymer or the like, into an organic solvent phase; adding water to the organic solvent phase (or adding the organic solvent phase to water); and turning the mixture into a microcapsule while subjecting the mixture to self dispersion (phase inversion emulsification). The phase inversion method may involve mixing the organic solvent phase with a water-soluble organic solvent or an additive to be used for ink. In particular, an aqueous medium of ink is preferably mixed because a dispersion solution for the ink can be directly produced.

The acid precipitation method includes the steps of: neutralizing in whole or in part the anionic groups of an organic polymer or the like having the anionic groups with a basic compound; kneading the resultant with a coloring material such as a self-dispersion organic pigment or self-dispersion carbon black in an aqueous medium; adjusting the pH of the resultant with an acid compound to be a neutral or acidic one to precipitate an anionic-group-containing organic polymer or the like; causing the organic polymer or the like to fix on a pigment to produce a water-containing cake; and neutralizing in whole or in part the anionic groups of the water-containing cake with a basic compound to prepare a microcapsule. The acid precipitation method allows a fine anionic microencapsulated pigment containing a large amount of pigment to be produced.

Specific examples of an organic solvent to be used for such microencapsulation as described above include: alkyl alcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane; and cellosolves such as methyl cellosolve and butyl cellosolve.

The microcapsules prepared according to the above method may be separated from organic solvents through centrifugation, filtration, or the like and stirred with water and a required solvent for re-dispersion to prepare a target microcapsule-type pigment. The average particle size of the microcapsule-type pigment to be obtained according to such a method as described above is preferably 50 nm to 180 nm.

(Self-Dispersion Pigment)

As described above, a self-dispersion pigment with its dispersibility enhanced to enable the dispersion of the pigment without the use of a dispersant or the like may be used as the water-insoluble coloring material that can be used in the aqueous ink according to the present invention. The self-dispersion pigment preferably has a hydrophilic group chemically bonded to the surface of a pigment particle either directly or via another atomic group. For example, a self-dispersion pigment having a hydrophilic group selected from the group consisting of —COOM1, —SO$_3$M1, and —PO$_3$H(M1)$_2$ (M1 in the formulae represents a hydrogen atom, an alkali metal, ammonium, or an organic ammonium) introduced to the surface of a pigment particle can be suitably used. The other atomic group is preferably an alkylene group having 1 to 12 carbon atoms, a substituted or unsubstituted phenylene group, or a substituted or unsubstituted naphthylene group. A self-dispersion pigment with its surface oxidized can also be suitably used, which is obtained by means of, for example, a method involving oxidizing carbon black with soda hypochlorite, a method involving oxidizing carbon black through a submerged ozone treatment, or a method involving performing an ozone treatment and subjecting carbon black to wet oxidation to denature the surface of carbon black.

(Polymer-Bonded Self-Dispersion Pigment)

As described above, a polymer-bonded self-dispersion pigment with its dispersibility enhanced to enable the dispersion of the pigment without the use of a dispersant or the like may be used as the water-insoluble coloring material that can be used in the aqueous ink according to the present invention. The polymer-bonded self-dispersion pigment preferably contains a reaction product of a functional group chemically bonded to the surface of the pigment either directly or via another atomic group; and a copolymer of an ionic monomer and a hydrophobic monomer. This is because the copolymerization ratio between the ionic monomer and the hydrophobic monomer as materials for forming a copolymer to be used for modifying the surface of the pigment can be appropriately changed, and the change allows the hydrophilicity of the modified pigment to be appropriately adjusted. Various properties can also be imparted to the surface of the pigment because the kinds of ionic and hydrophobic monomers to be used and the combination of the monomers can be appropriately changed.

[Functional Group]

A functional group of the polymer-bonded self-dispersion pigment is chemically bonded to the surface of the pigment either directly or via another atomic group. The functional group intends to constitute an organic group through a reaction with a copolymer to be described later, and the kind of the functional group is selected in connection with a functional group carried on the copolymer. The reaction between the functional group and the copolymer is preferably a reaction producing a bond that does not cause hydrolysis or the like such as an amide bond in consideration of the condition that the pigment is dispersed into an aqueous medium. To this end, an amino group is used as the functional group and the copolymer is allowed to carry a carboxyl group. Thus, the copolymer can be introduced to the surface of a pigment particle via an amide bond. Alternatively, a carboxyl group is used as the functional group and the copolymer is allowed to carry an amino group. Thus, the copolymer can be introduced to the surface of a pigment particle via an amide bond as described above.

The functional group may be chemically bonded to the surface of the pigment either directly or via another atomic group. However, when a copolymer having a relatively large molecular weight is to be introduced to the surface of the pigment, the functional group is preferably introduced to the surface of the pigment via another atomic group in order to prevent steric hindrance between copolymers. The other atomic group is not particularly limited as long as it is a polyvalent element or an organic group. However, by reason of the foregoing, for example, a divalent organic residue is preferably used from the viewpoint of control of a distance between the functional group and the surface of the pigment. Specific examples of the divalent organic residue include an alkylene group and an arylene (phenylene) group.

More specifically, in, for example, each example to be described later, a pigment is allowed to react with aminophenyl(2-sulfoethyl)sulfone to introduce an aminophenyl(2-sulfoethyl)sulfone group to the surface of the pigment, and then an amino group of pentaethylene hexamine and the aminophenyl(2-sulfoethyl)sulfone group are allowed to react with each other to introduce an amino group as a functional group. In this case, the amino group is chemically bonded to the surface of the pigment via an atomic group containing a phenyl(2-sulfoethyl) group. Of course, the present invention is not limited thereto.

[Copolymer]

A copolymer of an ionic monomer and a hydrophobic monomer is preferably, for example, an anionic copolymer having anionic property or a cationic copolymer having cationic property.

Examples of the anionic copolymer include a copolymer of a hydrophobic monomer and an anionic monomer, and a salt of the copolymer.

Specific examples of the hydrophobic monomer include: styrene; vinyl naphthalene; alkyl methacrylates such as methyl methacrylate; alkyl acrylates such as phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbil methacrylate, and methyl acrylate; phenyl acrylate; benzyl acrylate; acrylonitrile; 2-trimethylsiloxyethyl acrylate; glycidyl acrylate; p-tolyl acrylate; and sorbil acrylate. Specific examples of the anionic monomer include acrylic acid, methacrylic acid, and maleic acid. Of course, the present invention is not limited thereto.

An anionic copolymer of an anionic monomer and a hydrophobic monomer is composed of at least two monomers including any one selected from the hydrophobic monomers listed above and at least one selected from the anionic monomers listed above. Examples of the anionic copolymer include a block copolymer, a random copolymer, a graft copolymer, and salts of the copolymers.

Such anionic copolymer preferably has an acid value in the range of 100 to 500, and the acid values of the copolymer are preferably in the range of the average acid value±20% (both inclusive). When an acid value is higher than the above range, the hydrophilicity of the surface of the pigment becomes excessively high, so water and a solvent in the ink after printing may remain on the surface of the pigment to retard the expression of rub-off resistance or marker resistance after the printing on a recording medium. When an acid value is lower than the above range, the hydrophilicity of the surface of the pigment becomes excessively low, so the pigment may be hardly dispersed into the ink in a stable manner.

Examples of the salt of the anionic copolymer include: alkali metal (such as sodium, lithium, or potassium) salts; ammonium salts; alkylamine salts; and alkanolamine salts. Each of them may be used alone, or two or more of them may be appropriately used in combination.

Examples of the cationic copolymer include a copolymer of a hydrophobic monomer and a cationic monomer, and a salt of the copolymer.

Any one of the monomers listed above can be used as the hydrophobic monomer. Specific examples of the cationic monomer include allylamine, dimethylaminoethyl methacrylate, diethylaminoethyl methacrylate, tert-butylaminoethyl methacrylate, dimethylaminoethyl acrylate, diethylaminoethyl acrylate, dimethylaminopropyl methacrylamide, N-vinylcarbazole, methacrylamide, acrylamide, and dimethylacrylamide. Of course, the present invention is not limited thereto.

An anionic copolymer of a cationic monomer and a hydrophobic monomer is composed of at least two monomers including any one selected from the hydrophobic monomers listed above and at least one selected from the cationic monomers listed above. Examples of the cationic copolymer include a block copolymer, a random copolymer, a graft copolymer, and salts of the copolymers.

Such cationic copolymer preferably has an amine value in the range of 100 to 500, and the amine values of the copolymer are preferably in the range of the average amine value±20% (both inclusive). The amine value is determined by neutralizing 1 g of a sample and representing the amount required for the neutralization in KOHmg in correspondence with an acid value.

Examples of the salt of the cationic copolymer include acetic acid, hydrochloric acid, and nitric acid. Each of them may be used alone, or two or more of them may be appropriately used in combination.

The anionic or cationic copolymer described above has a weight average molecular weight (Mw) in the range of preferably 1,000 to 20,000, or more preferably 3,000 to 20,000. The polydispersity index (Mw/Mn) (where Mw represents a weight average molecular weight and Mn represents a number average molecular weight) of a cationic copolymer segment is preferably 3 or less. The content of the mass of such anionic or cationic copolymer is preferably 5% or more and 40% or less based on the mass of the pigment particles with their surfaces modified with the copolymer. In addition, the molecular weight distribution of a copolymer is preferably uniform because, when the copolymer has a large polydispersity index, the molecular weight distribution of the copolymer broadens, and hence the above-described properties based on the molecular weight of the copolymer are hardly expressed.

Next, a method involving chemically bonding an organic group to the surface of a pigment particle to modify a pigment will be described by taking carbon black as an example. The method to be used at this time may be any one of the generally used methods without any particular limitation as long as the method involves: introducing a functional group to the surface of a pigment particle; and bonding a copolymer composed of an ionic monomer and a hydrophobic monomer to the functional group to chemically bond the copolymer to the surface of the pigment particle.

Specifically, for example, each of the following methods can be used as such method. A method involving: introducing polyethyleneimine or the like to the surface of a pigment particle such as carbon black; and bonding, to the terminal functional group, a copolymer composed of an ionic monomer and a hydrophobic monomer, the copolymer having an amino group, through a diazonium reaction, and a method involving bonding, to the surface of a pigment particle such as carbon black, a copolymer having an amino group and a carboxyl group in a molecule through a diazonium reaction can be used. The most typical example out of the other methods is disclosed in WO 01/51566 A1.

For example, when an anionic copolymer is chemically bonded to the surface of a carbon black particle in the above method, the following three steps are performed.

First step; A step of adding an aminophenyl(2-sulfoethyl) sulfone group (APSES) to carbon black through a diazonium reaction.

Second step; A step of adding polyethyleneimine or pentaethylene hexamine (PEHA) to carbon black treated with APSES.

Third step; A step of bonding a copolymer of a hydrophobic monomer and an ionic monomer having a carboxyl group.

In the second step, the phenyl(2-sulfoethyl)sulfone group chemically bonded to the carbon black surface in the first step and an amino group of APSES are allowed to react with each other to introduce an amino group as a functional group chemically bonded to the carbon black surface. In the third step, for example, part of the carboxyl groups of the ionic monomer portion of the copolymer are allowed to react with amino groups to form amide bonds, whereby the copolymer can be introduced to the carbon black surface via an atomic group containing a phenyl(2-sulfoethyl) group as a residue of APSES and a residue of PEHA.

For example, when a cationic copolymer is chemically bonded to the surface of a carbon black particle in the above method, the following two steps are performed.

First step; A step of adding an aminophenyl(2-sulfoethyl) sulfone group (APSES) to carbon black through a diazonium reaction.

Second step; A step of bonding a copolymer of a hydrophobic monomer and a cationic monomer.

In the first step, a sulfone group is introduced as a functional group chemically bonded to the carbon black surface. In the second step, for example, part of the amino groups of the ionic monomer portion of the copolymer are allowed to react with sulfone groups (nucleophilic substitution) to introduce the copolymer to the carbon black surface via an atomic group containing a phenyl(2-sulfoethyl) group as a residue of APSES.

<Other Components>

For maintaining moisture retention, the aqueous ink according to the present invention may use a moisture-retaining solid content such as urea, a urea derivative, trimethylolpropane, or trimethylolethane as an ink component as well as the above components. The content of the moisture-retaining solid content such as urea, a urea derivative, or trimethylolpropane in the aqueous ink is generally in the range of 0.1 mass % to 20.0 mass %, or more preferably 3.0 mass % to 10.0 mass % based on the total mass of the ink.

The aqueous ink according to the present invention may contain any one of various additives such as a surfactant, a pH adjustor, a rust inhibitor, an antiseptic, a mildewproofing agent, an antioxidant, an antireducing agent, an evaporation accelerator, and a chelating agent as required as well as the above components.

The aqueous ink according to the present invention is preferably added with a nonionic surfactant for adjusting a surface tension and for improving ejection property. Specific examples of the nonionic surfactant include the compounds each having a structure represented by any one of the following structural formulae (1) to (4).

Structural formula (1)

(In the structural formula (1), R represents an alkyl group and n represents an integer.)

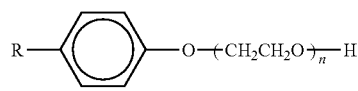

Structural formula (2)

(In the structural formula (2), R represents an alkyl group and n represents an integer.)

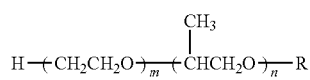

Structural formula (3)

(In the structural formula (3), R represents a hydrogen atom or an alkyl group, and m and n each represent an integer.)

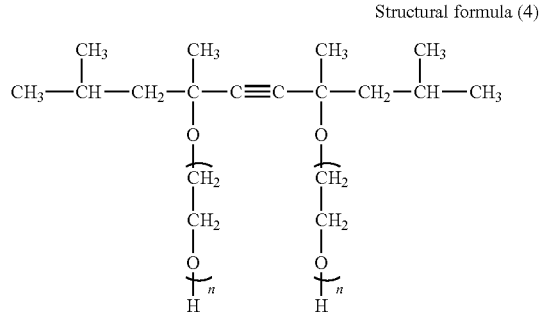

Structural formula (4)

(In the structural formula (4), m and n each represent an integer.)

In the structural formula (1), R preferably represents a linear or branched alkyl group having 8 to 21 carbon atoms, and n preferably represents an integer of 5 to 40. A mixture of two or more kinds of compounds different from each other in R and/or n may be used.

In the structural formula (2), R preferably represents a linear or branched alkyl group having (1) to 21 carbon atoms, and n preferably represents an integer of 5 to 40. A mixture of two or more kinds of compounds different from each other in R and/or n may be used.

In the structural formula (3), m preferably represents an integer of 1 to 10, and n preferably represents an integer of 1 to 10. It should be noted that m represents the number of ethylene oxide units and n represents the number of propylene oxide units. The compound represented by the structural formula (3) may be any one of a block copolymer, an alternating copolymer, and a random copolymer. A mixture of two or more kinds of compounds different from each other in m and/or n may be used.

In the structural formula (4), m preferably represents an integer of 1 to 10, and n preferably represents an integer of 1 to 10. A mixture of two or more kinds of compounds different from each other in m and/or n may be used.

The content of the compound having a structure represented by any one of the structural formulae (1) to (4) in the aqueous ink is in the range of preferably 0.05 mass % to 5 mass % (both inclusive), or more preferably 0.1 mass % to 2 mass % (both inclusive) based on the total mass of the aqueous ink.

<Physical Properties of Ink>

The aqueous ink to be used in the present invention composed of such components as described above preferably has property with which the ink can be favorably ejected from an ink-jet recording head. The ink preferably has properties including a viscosity of 1 to 15 mPa·s (particularly preferably 1 to 5 mPa·s) and a surface tension of 25 mN/m (dyne/cm) or more (particularly preferably 25 to 50 mN/m (dyne/cm)) from the viewpoint of ejection property from an ink-jet recording head.

[Reaction Liquid]

A reaction liquid to be used in the present invention contains a reactive component for making the state of dissolution or dispersion of a water-insoluble coloring material in ink unstable or causing flocculation of the water-insoluble coloring material. The reactive component reduces the dispersion stability of a water-insoluble coloring material and flocculates the water-insoluble coloring material when ink prepared by dispersing or dissolving the water-insoluble coloring material into an aqueous medium by virtue of an action of a hydrophilic group and the reaction liquid are brought into contact with each other on a recording medium. The phrase "the dispersed state of a coloring material in ink to be made unstable" as used herein refers to the fact that flocculation or gelation occurs when the ink and the reaction liquid are mixed on a recording medium.

Specific examples of the reactive component include metal salts (especially ions and salts of polyvalent metals), low-molecular-weight cationic compounds, and cationic polymers. Hereinafter, the reactive component will be described.

(Polyvalent Ions and Salts Thereof)

Specific examples of a polyvalent metal ion include: divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Al^{2+}$, $Fe^{3+}$, $Cr^{3+}$, and $Y^{3+}$. An example of a method of incorporating the polyvalent metal ion into a reaction liquid includes a method involving adding a polyvalent metal salt to the reaction liquid. The salt refers to a metal salt composed of each of the polyvalent metal ions listed above and an anion bonded to the polyvalent metal ion; provided, however, that the salt needs to be soluble in water. Examples of a preferable anion for forming a salt include $Cl^-$, $NO_3^-$, $I^-$, $Br^-$, $ClO_3^-$, $SO_4^{2-}$, $CO_3^{2-}$, $CH_3COO^-$, and $HCOO^-$. Of course, the present invention is not limited thereto. In the present invention, the polyvalent metal ion is preferably $Ca^{2+}$, $Mg^{2+}$, $Sr^{2+}$, $Al^{3+}$, or $Y^{3+}$ in terms of, for example, reactivity between the aqueous ink and the reaction liquid, coloring property, and the ease of handling of the reaction liquid, and is particularly preferably $Ca^{2+}$. The anion is particularly preferably $NO_3^-$ in terms of solubility and the like.

The content of the polyvalent metal ion in the reaction liquid is preferably 0.01 mass % or more and 10 mass % or less, or more preferably 1.0 mass % or more and 5 mass % or less based on the total mass of the reaction liquid in consideration of the effects according to the present invention. In particular, the content of the polyvalent metal ion is 2.0 mass % or more and 4.0 mass % or less based on the total mass of the reaction liquid for sufficiently exerting a function of unstabilizing the dispersed state of the water-insoluble coloring material in the aqueous ink to obtain a high level of image density. The content of the polyvalent metal ion in the reaction liquid may exceed 10 mass %. However, in general, there is no need to incorporate an excessive amount of polyvalent metal ion partly because a significant improvement of the function of unstabilizing the dispersed state of the water-insoluble coloring material cannot be expected from a content in excess of 10 mass %.

It is preferable that the reaction liquid contains no coloring material and be transparent; provided, however, that the reaction liquid does not need to show absorption in a visible range. That is, the reaction liquid may show absorption in the visible range as long as the reaction liquid has substantially no influences on an image.

(Means for Applying Reaction Liquid)

Examples of a method of applying a reaction liquid to a recording medium include application methods such as a roller coating method, a bar coating method, and a spray coating method. An application method is also applicable, which involves the use of an ink-jet recording method as in the case of ink to cause a reaction liquid to selectively adhere to only an image-forming region to which the ink adheres and the vicinity of the image-forming region. As a result of the investigation by the inventors of the present invention into a method of applying a reaction liquid to a recording medium, the inventors have found that the roller coating method is most excellent. This is because, even when the amount of a reaction liquid to be applied is small, the distributed state of a reactive component near the surface layer portion of a recording medium is more uniform than that in the case of any other means, and image quality such as a reduction in unevenness at a solid print portion after the application of ink or in strike-through is excellent.

For a system for forming an image by means of two liquids, various methods of bringing a reaction liquid and an ink into contact with each other on a recording medium are used. Examples of the methods include a method involving bringing a reaction liquid and an ink both in liquid states into contact with each other on a recording medium and a method involving: fixing a reaction liquid to a recording medium (that is, causing the recording medium to absorb a droplet of the reaction liquid therein); and applying the ink to the recording medium.

In the course of the investigation by the inventors of the present invention on a two-liquid system, the inventors have concluded that a method involving: fixing a reaction liquid to a recording medium; and applying an ink to the recording medium after the completion of the fixation is most excellent for providing a sufficiently large area factor even with a small amount of a reaction liquid to be applied and for improving the fixability of a recorded article. The reason for the conclusion is as follows. In the case where a reaction liquid and an ink both in liquid states are brought into contact with each other on a recording medium, a coloring material is more likely to flocculate near the surface of the recording medium as reactivity between the ink and the reaction liquid is stronger. As a result, very excellent coloring property is obtained, but the fastness properties (especially fixability) of an image may be insufficient. On the other hand, in the case where a reaction liquid is fixed to a recording medium and an ink is applied to the recording medium after the completion of the fixation, a high percentage of a reactive component in the reaction liquid is present at a position slightly depressed in the depth direction of the recording medium. Therefore, a higher percentage of the flocculate of the coloring material is formed at a position slightly depressed in the depth direction from the surface layer portion of the recording medium. In other words, the reaction liquid permeates into the recording medium before the ink is applied to the recording medium, so the rate of permeation of the aqueous medium in the ink into the recording medium increases. As a result, a sufficiently large area factor can be obtained even with a smaller amount of a reaction liquid than that in the case where two liquids both in liquid states are present on a recording medium, and excellent fastness properties of an image can be obtained.

The term "time at which fixation is complete" as used herein refers to the time at which the value of $Ka(t-t_w)^{1/2}$ represented by Bristow's equation becomes larger than the amount of a reaction liquid actually applied to a recording medium. The time also means the time at which a droplet of the reaction liquid is absorbed by the recording medium, and means t seconds calculated from the Ka value determined by the Bristow method and the amount of a liquid composition applied.

(Physical Properties and Application Amount of Reaction Liquid)

The Ka value determined by the Bristow method representing the permeability of a reaction liquid into a recording medium is preferably 1.3 $mL \cdot m^{-2} \cdot msec^{-1/2}$ or more and 6.0 $mL \cdot m^{-2} \cdot msec^{-1/2}$ or less, or more preferably more than 3.0 $mL \cdot m^{-2} \cdot msec^{-1/2}$ and 6.0 $mL \cdot m^{-2} \cdot msec^{-1/2}$ or less. The amount of the reaction liquid to be applied is preferably 0.5 $g/m^2$ or more and 5 $g/m^2$ or less, or more preferably more than 2.0 $g/m^2$ and 3.0 $g/m^2$ or less.

The amount of a reaction liquid to be applied can be appropriately adjusted in accordance with, for example, the physical properties of the reaction liquid, the rotating speed of a roller used for an applying apparatus, and the pressure at which the roller is brought into contact with a recording medium.

Furthermore, the reaction liquid must be allowed to react with only the aqueous ink according to the present invention. Therefore, in order to prevent the reaction liquid from bleeding to a portion different from a recording portion by the aqueous ink of the present invention on the recording medium, the surface tension of the reaction liquid is preferably larger than that of an aqueous ink containing a water-insoluble coloring material whose dispersed state is to be unstabilized by the reaction liquid to such an extent that the reaction liquid can be ejected from a recording head.

<Ink Set>

The first aqueous ink and the second aqueous ink according to the present invention may be used in combination to provide an ink set. The first aqueous ink and the second aqueous ink may have any hue as long as they have the same hue. For example, the first aqueous ink and the second aqueous ink may have a black hue. Alternatively, the first aqueous ink and the second aqueous ink having any hue except a black hue (such as a cyan, magenta, or yellow hue) may constitute an ink set. Furthermore, each of an ink set of black inks, an ink set of cyan inks, an ink set of magenta inks, and an ink set of yellow inks may be used alone, or two or more of them may be used in combination.

The ink set may be of any one of the forms listed below as long as the ink set has a combination of multiple inks. Examples of the form of the ink set include: an ink set constituted by an ink tank having tanks each storing the first aqueous ink or the second aqueous ink according to the present invention integrated with each other or by an ink tank with a head; and an ink set having individual ink tanks storing such inks as described above detachably attached to a recording apparatus. Of course, the present invention is not limited to those forms described above, and any modified form is also applicable.

<Image-Forming Method>

Hereinafter, an image-forming method according to the present invention will be described by way of specific examples. The image-forming method according to the present invention is characterized in that the kind of aqueous ink to be used for a reaction liquid applying step is different from that of aqueous ink to be used for a reaction liquid non-applying step.

Figure 11:
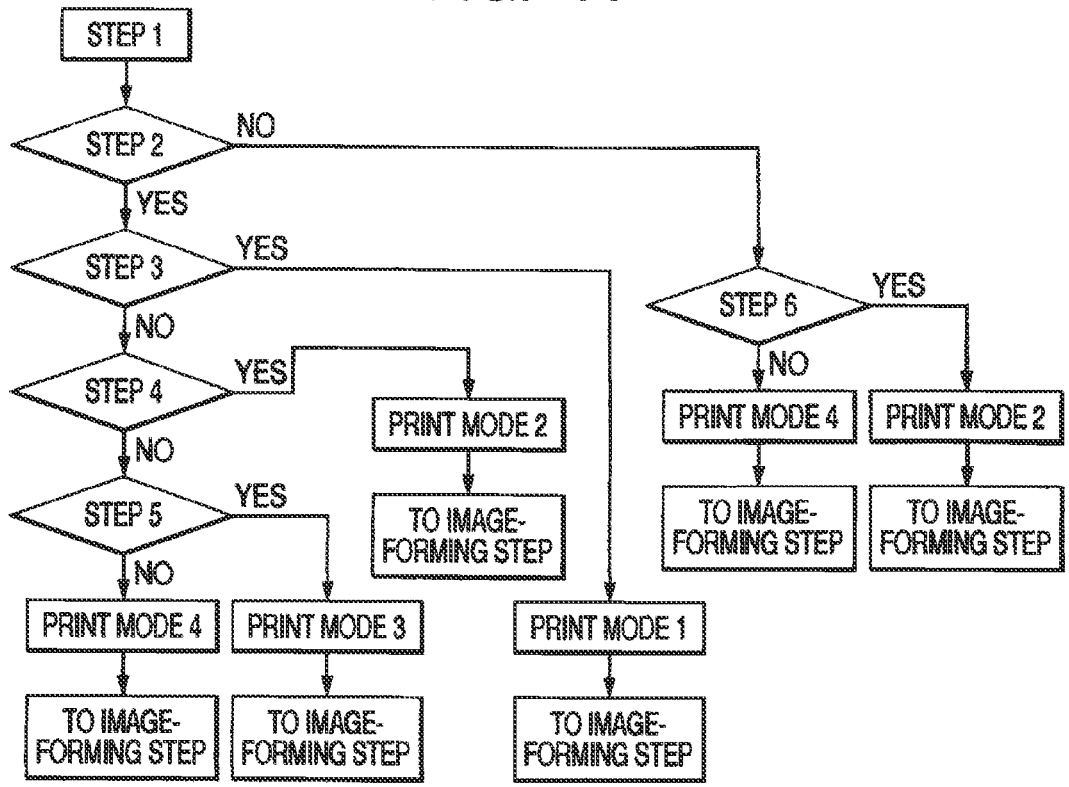
FIG. 11 shows an example of a printing mode flow.

FIG. 11 shows a flow of an example of an instruction form from the selection of a printing mode to the application of ink to a recording medium. After a printing mode has been selected by a user or automatically (STEP 1), determination as to whether the mode is a mode for applying a reaction liquid to a recording medium is made (STEP 2). After the mode has been determined, in STEP 3 or STEP 6, the preset printing pattern enters a route for determination. When a printing mode 1 is selected in STEP 3, an ink to be used is determined to be a first aqueous ink, and the flow moves to a subsequent image-forming step. When the printing mode 1 is not selected in STEP 3, the flow moves to STEP 4. When a printing mode 2 is selected in STEP 4, ink to be used is determined to be a second aqueous ink, and the flow moves to a subsequent image-forming step. When the printing mode 2 is not selected in STEP 4, the flow moves to STEP 5. When a printing mode 3 is selected in STEP 5, inks to be used are determined to be the first aqueous ink and the second aqueous ink, and the flow moves to a subsequent image-forming step. When the printing mode 3 is not selected in STEP 5, a printing mode 4 is selected. When the printing mode 4 is selected, none of the first aqueous ink and the second aqueous ink is used, and ink having another constitution is used to form an image. Meanwhile, even when a mode for applying no reaction liquid is selected, the flow goes into a route for determining preset printing patterns as in the case of the mode for applying a reaction liquid (STEP 6). When the printing mode 2 is selected in STEP 6, ink to be used is determined to be the second aqueous ink, and the flow moves to a subsequent image-forming step.

When the printing mode 2 is not selected in STEP 6, the printing mode 4 is selected. When the printing mode 4 is selected, none of the first aqueous ink and the second aqueous ink is used, and ink having another constitution is used to form an image.

The image-forming method according to the present invention is an image-forming method including performing recording on a recording medium such as plain paper by means of a black ink and at least one aqueous color ink according to an ink-jet recording system, in which: the aqueous ink of the present invention described above is used as the black ink; and in forming an image composed of an image formed by the black ink and an image formed by such color ink as described above are adjacent to each other, performing scanning for applying the black ink to form the image and thereafter performing scanning for applying the color ink to the area where the image has been formed by the precedent scanning.

In the image-forming method according to the present invention, each of the first aqueous ink and the second aqueous ink is preferably used as black ink, and image formation by color ink is preferably performed after image formation by the black ink, or, more preferably, the color ink is applied by scanning with delay of at least one scanning after application of the black ink by scanning, whereby an image can be formed, in which bleeding at a portion where an image formed by the black ink and an image formed by the color ink are adjacent to each other is alleviated even when the black ink is in contact with the color ink on a recording medium, and which is excellent in bleeding resistance. That is, image formation by black ink and image formation by each color ink are performed at different times, so such excellent effects as described above can be obtained without any need for a method involving performing multi-path printing in which scan is performed multiple times to complete printing (in short, a long printing time is required), or a method involving an increase in size of a device in which recovery systems are separately prepared for the black ink and the color ink.

Hereinafter, a specific approach of the image-forming method of the present invention will be described.

Figure 4:
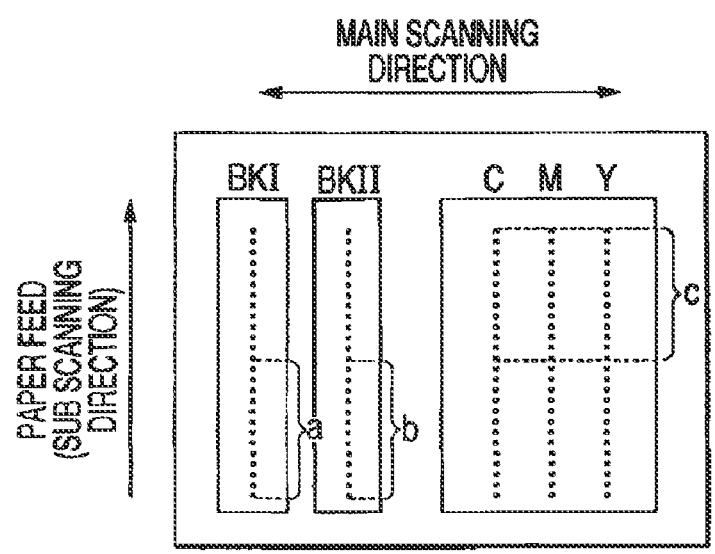
FIG. 4 is a view showing an example of the constitution of a recording head.

FIG. 4 shows an example of a recording head to be used for performing the image-forming method according to the present invention. As shown in FIG. 4, the recording head includes ejection orifice trains for ejecting black inks (a black ink BKI to be used for a reaction liquid non-applying step/a black ink BKII to be used only for a reaction liquid applying step) and ejection orifice trains for ejecting three color inks, that is, a cyan (C) ink, a magenta (M) ink, and a yellow (Y) ink.

In the image-forming method of the present invention, a recording head in which an ejection orifice train for black ink for ejecting a black ink and an ejection orifice train for color ink for ejecting a color ink are arranged so as to shift from each other in a subscanning direction is preferably used for forming a full-color image. To be specific, for example, when the recording head shown in FIG. 4 is used to form an image, the entire region of the ejection orifice trains for black ink is preferably used for the formation of an image composed only of a black color, while, when a full-color image in which a black image and a color image are simultaneously present is to be formed, the part a or part b of the ejection orifice trains for black ink is preferably used for the black ink and the part c of the ejection orifice trains for color ink is preferably used for the color inks of C, M, and Y to form an image. Hereinafter, the formation of an image in which a black image and a color image are simultaneously present will be described in more detail.

FIG. 4 shows an example of a recording head that can be used in the present invention. The recording head includes ejection orifice trains (BkI and BKII) for ejecting black inks and ejection orifice trains for ejecting three color inks, that is, a cyan (C) ink, a magenta (M) ink, and a yellow (Y) ink. At first, the part a or part b of the ejection orifice trains for black (the black ink BKI to be used for a reaction liquid non-applying step/the black ink BKII to be used only for a reaction liquid applying step) is used to scan a print head in the horizontal direction in the figure (main-scanning direction), whereby data on a black image is formed through one-path printing on a recording medium. Next, the recording medium is conveyed in the vertical direction in the figure (subscanning direction) by a distance of a. During the process of the subsequent main scanning of the print head in an approaching direction, the part c of the ejection orifice trains for color ink is used to form a color image through one-path printing in the image region where the image has been formed by the part a or part b of the ejection orifice trains for black ink (the black ink BKI to be used for a reaction liquid non-applying step/the black ink BKII to be used only for a reaction liquid applying step). At this time, the part a or part b of the ejection orifice trains for black ink (the black ink BKI to be used for a reaction liquid non-applying step/the black ink BKII to be used only for a reaction liquid applying step) forms an image in a subsequent region. An image in which a black image and a color image are simultaneously present is formed through the repetition of the above procedure.

Figure 5:
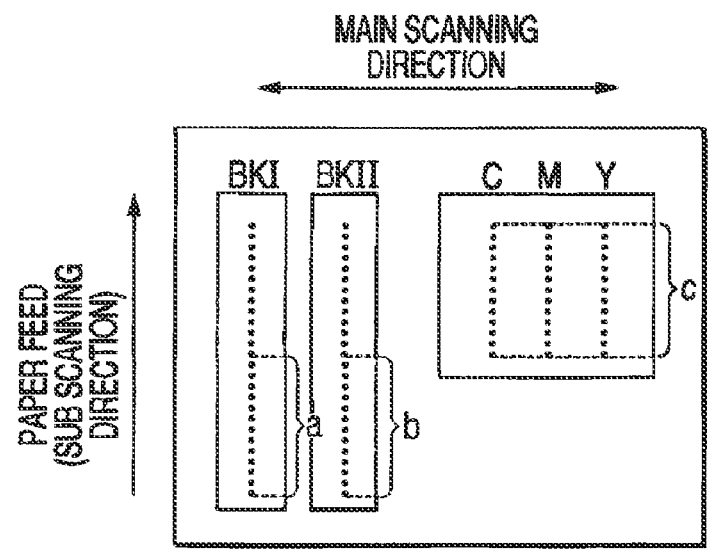
FIG. 5 is a view showing an example of the constitution of a recording head.

FIG. 5 shows another example of a recording head that can be used in the present invention. As in the case of FIG. 4, in FIG. 5 as well, the part a or part b of the ejection orifice trains for black ink (the black ink BKI to be used for a reaction liquid non-applying step/the black ink BKII to be used only for a reaction liquid applying step) is used for a black ink and the part c corresponding to the entire region of the ejection orifice trains for color ink is used for color inks of C, M, and Y. Then, in the same manner as that described above, an image in which a black image and a color image are simultaneously present is formed.

Figure 6:
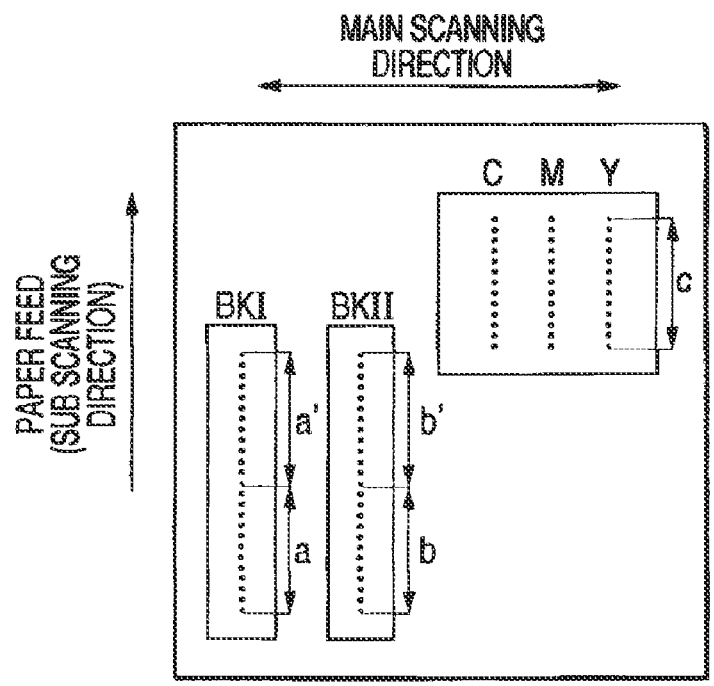
FIG. 6 is a view showing an example of the constitution of a recording head.

FIG. 6 shows another example of a recording head that can be used in the present invention. As in the case of FIG. 4, in FIG. 6 as well, the part a or part b of the ejection orifice trains for black ink (the black ink BKI to be used for a reaction liquid non-applying step/the black ink BKII to be used only for a reaction liquid applying step) is used for a black ink and the part c corresponding to the entire region of the ejection orifice trains for color ink is used for color inks of C, M, and Y. Then, an image in which a black image and a color image are simultaneously present is formed. In the recording head shown in FIG. 6, the part a or part b of the ejection orifice trains for black ink (the black ink BKI to be used for a reaction liquid non-applying step/the black ink BKII to be used only for a reaction liquid applying step) and the part c of the ejection orifice trains for color ink are distant from each other by an amount a' (or b') for single sheet feeding. For this reason, in the recording head having such constitution, a time difference for one scan is excessively generated by a reciprocation during the time period from the formation of a black image to the formation of a color image. Therefore, the constitution of the recording head shown in FIG. 6 more effectively suppresses bleeding between a black image and a color image than the constitution of the recording head shown in FIG. 5.

Figure 7:
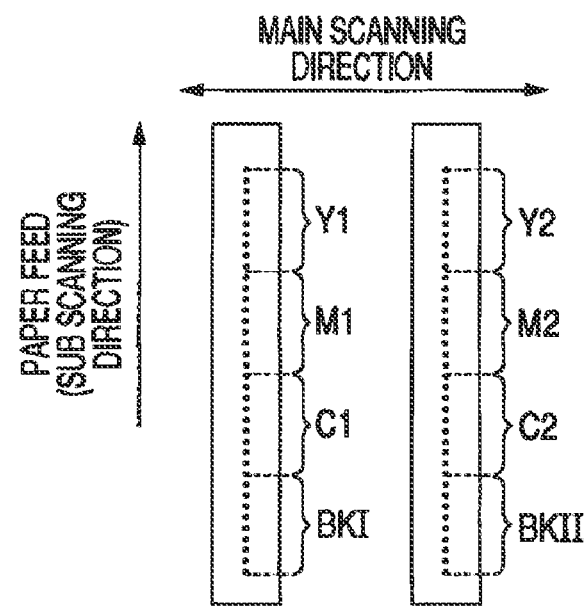
FIG. 7 is a view showing an example of the constitution of a recording head.

FIG. 7 shows another example of a recording head that can be used in the present invention. In the case where a recording head as shown in FIG. 7 in which ejection orifice trains for black and color inks are arranged in order in a single file in a subscanning direction is used, a color image is formed after a black image has been formed in accordance with sheet feeding.

Figure 8:
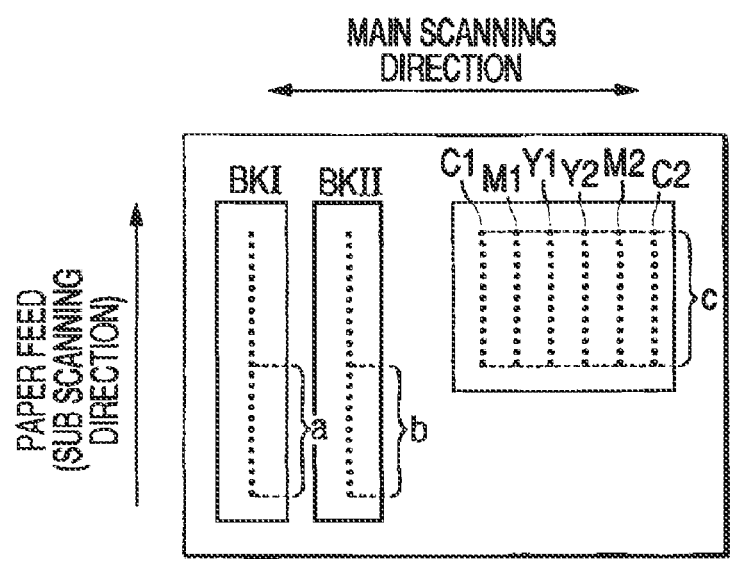
FIG. 8 is a view showing an example of the constitution of a recording head.

FIG. 8 shows another example of a recording head that can be used in the present invention. The recording head shown in FIG. 8 has two ejection orifice trains for each of cyan ink (C1 and C2), magenta ink (M1 and M2), and yellow ink (Y1 and Y2) arranged so as to be symmetric with respect to each other in the main-scanning direction in such a manner that the order of impact of color ink of scanning in an approaching direction and that of scanning in a returning direction are identical to each other. As a result, bidirectional printing can be performed even in the formation of an image in which a black image and a color image are simultaneously present. In this case, at first, a black image is formed by the part a or part b of the ejection orifice trains for black ink (the black ink BKI to be used for a reaction liquid non-applying step/the black ink BKII to be used only for a reaction liquid applying step) and then a recording medium is conveyed by a distance of a (or b) in the subscanning direction. During the process of the subsequent main scanning of a print head in the returning direction, the part c of the ejection orifice trains for color ink is used to form a color image through one-path printing in the image region where the image has been formed by the part a or part b of the ejection orifice trains for black ink (the black ink BKI to be used for a reaction liquid non-applying step/the black ink BKII to be used only for a reaction liquid applying step). At this time, the part a or part b of the ejection orifice trains for black ink (the black ink BKI to be used for a reaction liquid non-applying step/the black ink BKII to be used only for a reaction liquid applying step) forms an image in a subsequent region. An image in which a black image and a color image are simultaneously present is formed through the repetition of the above procedure.

Even in such recording head corresponding to bidirectional printing as shown in FIG. 8, as in the case of the recording head described with reference to FIG. 6, the part a or part b of the ejection orifice trains for black ink (the black ink BKI to be used for a reaction liquid non-applying step/the black ink BKII to be used only for a reaction liquid applying step) and the part c of the ejection orifice trains for color ink may be distant from each other by an amount a' (or b') for single sheet feeding (see FIG. 9), and a time difference for one scan may be generated by a reciprocation during the time period from the formation of a black image to the formation of a color image, to thereby suppress bleeding between a black image and a color image with improved effectiveness.

The image-forming method according to the present invention has been described above. Of course, the form of a recording head that can be used for the image-forming method according to the present invention is not limited to those shown in FIGS. 4 to 9. In addition, printing is not limited to one-path printing because the number of paths differs depending on recording apparatus.

<Ink-Jet Recording Method, Recording Unit, Cartridge, and Ink-Jet Recording Apparatus>

Next, an example of an ink-jet recording apparatus suitable for the present invention will be described.

FIG. 1 shows a partial sectional view of an example of an ink-jet recording apparatus. The ink-jet recording apparatus employs a serial-type ink-jet recording method and includes: a recording head 1; a sheet-feeding cassette 16 having a sheet-feeding tray 17 for feeding a recording medium (which may hereinafter be referred to as recording paper) 19 and means for applying a reaction liquid integrally formed; drive means for allowing the recording head to move back and forth in the direction (main-scanning direction) perpendicular to the direction in which the recording paper is conveyed (hereinafter, referred to as the "conveying direction") (subscanning direction); and control means for controlling the drive of the components.

The recording head 1 is mounted on a carriage 2 in such a manner that a surface having ink ejection orifices formed thereon faces a platen 11. Although not shown, the recording head 1 includes: the ink ejection orifices; multiple electrothermal transducers (such as heat elements) to heat an ink liquid; and a substrate supporting them. The recording head 1 has an ink cartridge installed in a carriage placed in the upper part thereof.

The carriage 2 has the recording head 1 mounted thereon, and can move back and forth along two guide shafts 9 extending in parallel with the width direction of the recording paper 19. In addition, the recording head 1 is driven to eject ink droplets to the recording paper 19 in synchronization with the reciprocating motion of the carriage to form an image. The sheet-feeding cassette 16 is detachable from a main body of the ink-jet recording apparatus. The sheets of the recording paper 19 are stacked on the sheet-feeding tray 17 in the sheet-feeding cassette 16. During sheet feeding, the uppermost sheet is pressed against a sheet-feeding roller 10 by a spring 18 for pressing the sheet-feeding tray 17 upward. The sheet-feeding roller 10 has an almost semicircle cross section, and is rotated by a motor (not shown) to feed only the uppermost sheet (recording paper 19) with a separation claw (not shown).

The separately fed recording paper 19 is conveyed along a convey surface of the sheet-feeding cassette 16 and a convey surface of a paper guide 27 by a large diameter intermediate roller 12 and a small diameter applying roller 6 pressed against the intermediate roller 12. Those convey surfaces are curved in an arc concentric with the intermediate roller 12. Thus, the fed recording paper 19 is conveyed along those convey surfaces to reverse its conveying direction. That is, the surface of the recording paper 19 on which printing is to be performed (printing surface) faces downward until the recording paper 19 is conveyed from the sheet-feeding tray 17 and reaches the intermediate roller 12, but faces upward (recording head side) when the recording paper 19 faces the recording head 1. Thus, the printing surface of the recording paper always faces outward from the ink-jet recording apparatus.

The means for applying the reaction liquid is arranged in the sheet-feeding cassette 16, and includes: a supply tank 22 for supplying a reaction liquid 15; the intermediate roller 12 rotatably supported with its circumferential surface partly immersed in the supply tank 22; and the applying roller 6 arranged in parallel to and in contact with the intermediate roller 12 to rotate in the same direction. Further, the applying roller 6 is arranged in such a manner that its circumferential surface is in contact with and in parallel to the intermediate roller 12 that conveys the recording paper 19. Thus, when the recording paper 19 is conveyed, the intermediate roller 12 and the applying roller 6 rotate in association with the rotation of the intermediate roller 12. As a result, the reaction liquid 15 is supplied to the circumferential surface of the applying roller 6 by a supply roller 13, and the reaction liquid is applied uniformly by the supply roller 6 to the printing surface of the recording paper 19 sandwiched between the applying roller 6 and the intermediate roller 12.

The ink-jet recording apparatus is provided with a float 14 in the supply tank 22. The float 14 is formed of a substance having a smaller specific gravity than that of the reaction liquid 15, and floats on the surface of the reaction liquid, thereby allowing one to visually observe the remaining amount of the reaction liquid containing a reactive component through a remaining amount display window 21 formed of a transparent member.

Figure 2:
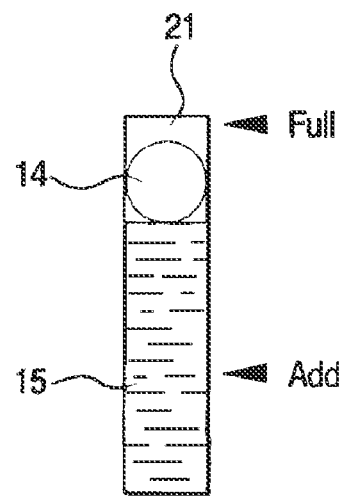
FIG. 2 is a front sectional view of a reaction liquid remaining amount display portion arranged in the ink-jet recording apparatus of FIG. 1.

FIG. 2 is a front view of the remaining amount display window. The remaining amount display window is provided with an indicator indicating a level of the remaining amount along the longitudinal direction of the remaining amount display window 21. In the figure, the tank is full with the reaction liquid when the surface of the reaction liquid or the float 14 reaches the position marked "Full". In contrast, the surface of the reaction liquid or the float 14 at the position marked "Add" indicates that the remaining amount of the reaction liquid is small. Thus, external observation of the remaining amount display window 21 makes it very clear that the reaction liquid 15 should be supplied when the level of the reaction liquid 15 gradually drops and the float 14 reaches the Add line.

Figure 3:
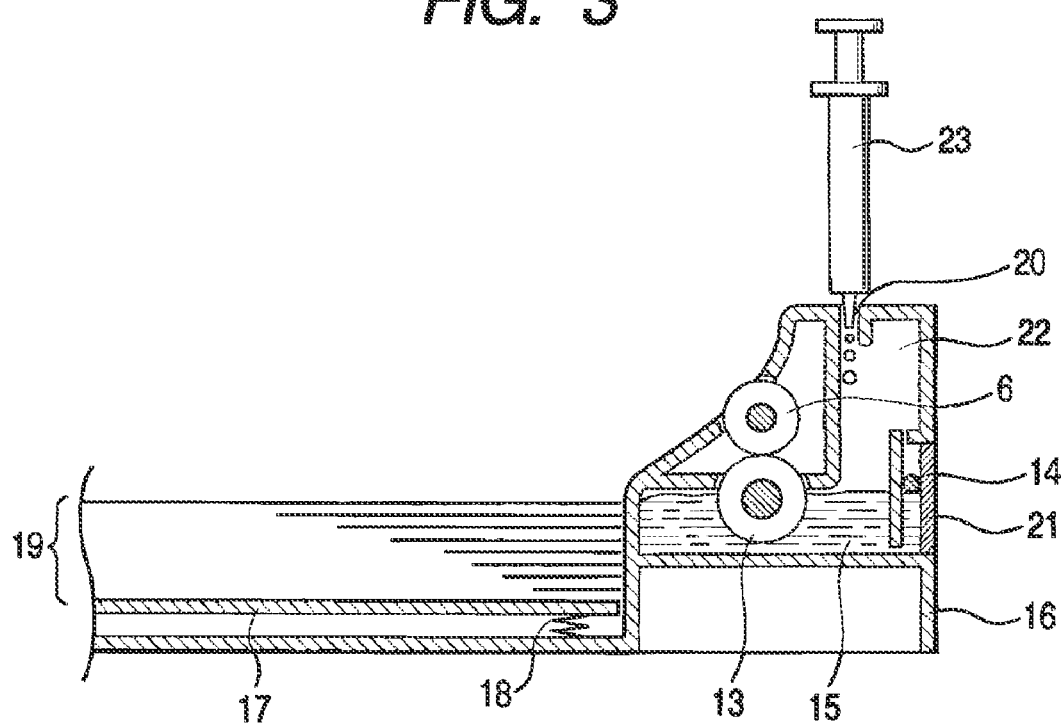
FIG. 3 is a schematic side sectional view showing a state where the ink-jet recording apparatus of FIG. 1 is replenished with a reaction liquid.

FIG. 3 describes the method of supplying the reaction liquid. That is, the sheet-feeding cassette 16 is pulled out of the main body of ink-jet recording apparatus, and the tip of an injector 23 is inserted into an inlet 20 made of a split-rubber member to inject the reaction liquid into the supply tank 22.

In this way, the recording paper having the reaction liquid applied thereto is then conveyed at a certain speed by a main conveying roller 7 and a pinch roller 8 pressed against the main conveying roller 7 to reach a recording part, where the ink is applied to the recording paper from the recording head 1. The recording sheet 19 fed and printed in the configuration described above is discharged and conveyed by a sheet-discharge roller 3 and a spur 4 pressed against the sheet-discharge roller 3, and is then stacked on a sheet-discharge tray 5.

When a reaction liquid is applied by means of a roller or the like, the viscosity of the reaction liquid is particularly preferably higher than that of ink because the ink can be effectively unstabilized even with a small amount of the reaction liquid to be applied and the fixability or the like of a recorded article becomes good. More specifically, when the viscosity of the reaction liquid is high, a polyvalent metal ion is more likely to remain near the surface of a recording medium, and hence readily reacts with the ink. After the ink has reacted with the reaction liquid, a coloring material component in the ink preferably remains near the surface of the recording medium so that a water-soluble organic solvent, water, and the like quickly permeate into the recording medium. That is, solid-liquid separation is preferably performed quickly. Therefore, the viscosity of the reaction liquid is preferably as low as possible from the viewpoint of the fixability of a recorded article. The viscosity of the reaction liquid to be applied by means of a roller or the like is preferably 3 mPa·s or more and 100 mPa·s or less, or more preferably 5 mPa·s or more and 60 mPa·s or less. The viscosity of the reaction liquid or the ink in the present invention can be measured according to an ordinary method in an environment having a temperature of 25° C.

EXAMPLES

Hereinafter, the present invention will be described more specifically by way of examples and comparative examples. The present invention is not limited to the following examples without departing from the gist of the present invention. The terms "part(s)" and "%" in the following description are on a mass basis unless otherwise stated.

(Preparation of Black Pigment Dispersion Solution 1)

10 parts of carbon black having a specific surface area of 210 $m^2/g$ and a DBP oil absorption of 74 ml/100 g, 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 1 hour by means of a sand grinder. The resultant dispersion solution was centrifuged to remove coarse particles. After that, the remainder was filtered through a microfilter having a pore size of 3.0 μm (manufactured by Fuji Photo Film Co., Ltd.) under pressure to prepare a resin-dispersed pigment 1. Then, water was added to disperse the resin-dispersed pigment 1 thus prepared to attain a pigment concentration of 10 mass %, thereby preparing a dispersion solution. Thus, a black pigment dispersion solution 1 was prepared.

(Preparation of Black Pigment Dispersion Solution 2)

10 g of carbon black having a specific surface area of 230 $m^2/g$ and a DBP oil absorption of 70 ml/100 g, 3.41 g of p-amino-N-benzoic acid, and 72 g of water were sufficiently mixed, and 1.62 g of nitric acid were added dropwise to the mixture, followed by stirring at 70° C. Several minutes after that, a solution prepared by dissolving 1.07 g of sodium nitrite into 5 g of water was added to the resultant, and the whole was stirred for an additional 1 hour. After the resultant slurry had been filtered through filter paper (trade name: Standard filter paper No. 2; manufactured by Advantech), particles were sufficiently washed with water and dried in an oven at 90° C. to prepare a self-dispersion carbon black 2. Then, water was added to disperse the self-dispersion carbon black 2 thus prepared to attain a pigment concentration of 10 mass %, thereby preparing a dispersion solution. Thus, a black pigment dispersion solution 2 was prepared, in which a hydrophilic group was introduced to the surface of a carbon black particle via a phenyl group and the anionically charged self-dispersion carbon black 2 was dispersed into water.

(Preparation of Reaction Liquid)

The respective components shown below were mixed and sufficiently stirred. After that, the resultant was filtered through a microfilter having a pore size of 1 μm (manufactured by Fuji Photo Film Co., Ltd.) under pressure to prepare a reaction liquid.

| | |
|---|---|
| Calcium nitrate (tetrahydrate) | 18.0 mass % |
| Trimethylolpropane | 25.0 mass % |
| Acetylenol EH | 1.0 mass % |
| (Ethylene oxide adduct of acetylene glycol; manufactured by Kawaken Fine Chemicals Co., Ltd.) | |
| Pure Water | 56.0 mass % |

[Judgment on Good Medium and Poor Medium of Water-Soluble Organic Solvents]

The following experiment was performed in order to select a water-soluble organic solvent to act as a good medium or a poor medium for the pigment, or the pigment and the dispersant, in each of the above pigment dispersion solutions. First, aqueous solutions of the respective pigment dispersion solutions thus prepared each having a solid concentration of 10 mass % were prepared. These aqueous solution and respective water-soluble organic solvents were used to prepare solvent-judgment dispersion solution A solvent-judgment water dispersion solution B for judgment on good medium and poor medium at the following compounding ratios.

Solvent-judgment dispersion solution A
each pigment dispersion solution having solid concentration of 10 mass %: 50 parts
each water-soluble organic solvent shown in Table 1: 50 parts
Solvent-judgment water dispersion solution B
each pigment dispersion solution having solid concentration of 10 mass %: 50 parts
pure water: 50 parts (Judgment Method)

Next, 10 g of the each dispersion solution A for judgment on good medium and poor medium thus prepared were charged into a transparent sample bottle made of glass and equipped with a cap. After the bottle had been capped, the dispersion solution was sufficiently stirred, and the bottle was left standing in an oven at 60° C. for 48 hours. After that, the dispersion solution taken out of the oven was provided as a sample for measurement, and the average particle size of the pigment in the dispersion solution was measured with a fiber-optics particle analyzer (trade name: FPAR-1000; manufactured by Otsuka Electronics Co., Ltd.). The measured particle size was defined as the average particle size of the pigment in the dispersion solution A for judgment after storage at 60° C. for 48 hours (average particle size of the pigment measured without dilution). Meanwhile, the water dispersion solution B for judgment was not stored under heat, and the average particle size of the pigment in the dispersion solution was measured with the fiber-optics particle analyzer in the same manner as that described above. Then, when the average particle size of the pigment in the solvent-judgment dispersion solution A was larger than that of the pigment in the solvent-judgment water dispersion solution B, the water-soluble organic solvent was determined to be a poor medium. When the average particle size of the pigment in the solvent-judgment dispersion solution A was equal to or smaller than that of the pigment in the solvent-judgment water dispersion solution B for determination, the water-soluble organic solvent was determined to be a good medium.

[Measurement of Ka Value for Water-Soluble Organic Solvent]

First, in measuring the Ka value of each water-soluble organic solvent, a dye aqueous solution at a dye concentration of 0.5 mass % having the following composition was prepared. Such dye aqueous solution was used for visualizing a colorless and transparent sample by staining the sample, to thereby facilitate the measurement of the Ka value.
Water-soluble dye C.I. Direct Blue 199: 0.5 part
Pure water: 99.5 parts Next, a 20% aqueous solution of each water-soluble organic solvent to be measured stained with the 0.5 mass % dye aqueous solution and having the following composition was prepared.
0.5 mass % dye aqueous solution: 80 parts
Water-soluble organic solvent shown in Table 1: 20 parts The Ka value of the 20 mass % aqueous solution of each water-soluble organic solvent thus prepared as a sample for measurement was measured by means of a dynamic permeability tester (trade name: Dynamic permeability tester S; manufactured by Toyo Seiki Seisaku-Sho, Ltd.) according to the Bristow method.

<Results of Judgment and Measurements>

Table 1 shows the results of determination as to whether each water-soluble organic solvent that can be used for ink thus measured is a good medium or a poor medium for any one of the black pigment dispersion solutions 1 and 2 and shows the measurement of the Ka value of each water-soluble organic solvent in a 20 mass % aqueous solution. 'o' and 'x' in the table represent a good medium and a poor medium, respectively.

TABLE 1

| Water-soluble organic solvent | Water-insoluble coloring material | | Ka value of 20-mass % aqueous solution of water-soluble organic solvent [ml/m²/msec^{1/2}] |
|---|---|---|---|
| | Black pigment dispersion solution 1 | Black pigment dispersion solution 2 | |
| Glycerin | o | o | 0.13 |
| Trimethylolpropane | o | o | 0.19 |
| Polyethylene glycol 600 | x | x | 0.17 |

[Preparation of Ink]

The respective components shown in Table 2 below were mixed and sufficiently stirred. After that, the resultant was filtered through a microfilter having a pore size of 3.0 μm (manufactured by Fuji Photo Film Co., Ltd.) under pressure to prepare each of black inks BK1 to BK11.

TABLE 2

| | Black ink | | | | | | | | | | |
|---|---|---|---|---|---|---|---|---|---|---|---|
| | BK1 | BK2 | BK3 | BK4 | BK5 | BK6 | BK7 | BK8 | BK9 | BK10 | BK11 |
| Black pigment dispersion solution 1 | | | 50 | 50 | 50 | 50 | 50 | 50 | 30 | | 50 |
| Black pigment dispersion solution 2 | 50 | 50 | | | | | | | | 30 | |
| Glycerin | 10 | 5 | 8 | 6 | 5 | 3 | 10 | 15 | 10 | 10 | 10 |
| Trimethylolpropane | | | | | 7 | | | | | | |
| Polyethylene glycol 600 | 10 | 15 | 4 | 3 | 10 | 15 | 4 | | 4 | 4 | 5 |
| EO adduct of acetylene glycol (*) | 1 | 1 | 1 | 1 | 1 | 1 | 1 | 1 | 1 | 1 | 1 |
| Pure water | Balance | Balance | Balance | Balance | Balance | Balance | Balance | Balance | Balance | Balance | Balance |

(*) Acetylenol E100 manufactured by Kawaken Fine Chemicals Co., Ltd.

[Evaluation of Image Density and Gloss]
<Production of Recorded Article>

Recorded articles of Examples 1 to 8, Reference Examples 1 and 2, and Comparative Examples 1 to 4 were produced by using the respective BK inks and a reaction liquid thus prepared in combination as shown in Table 3 below. Used for the production of the recorded articles were an apparatus having a mechanism shown in FIG. 1 with which a reaction liquid was applied to a recording medium by means of an applying roller and an ink-jet recording apparatus BJF 900 (manufactured by CANON Inc.) having an on-demand multi-recording head for ejecting ink by applying thermal energy to the ink in accordance with a recording signal. When an ink and a reaction liquid were used in combination, the reaction liquid was applied and fixed to a recording medium (plain paper) before each ink was applied to the recording medium to form an image. The speed of the roller and the pressure at which the roller contacted with the recording medium were adjusted in such a manner that the amount of the reaction liquid to be applied would be 2.4 g/m².

A default mode was selected for a printer driver when plain paper was used as a recording medium. Setting conditions for the default mode are as follows.
Kind of paper: Plain paper
Printing quality: Standard
Color adjustment: Automatic The following plain papers were used as recording media.
PPC paper PB PAPER (manufactured by CANON Inc.)
PPC paper SC-250C (manufactured by CANON Inc.)
PPC paper 4200 (manufactured by Fuji Xerox Co., Ltd.)
PPC paper 4024 (manufactured by Fuji Xerox Co., Ltd.)
Super white paper SW-101 (manufactured by CANON Inc.)
PPC paper for CANON Inc. (manufactured by Neuzidler)
PPC paper prover bond (manufactured by Fox River)
Hammer mill (manufactured by International Paper)

A pro photo paper mode was selected for a printer driver when a glossy recording medium (Professional photopaper PR-101: manufactured by CANON Inc.) was used as a recording medium. Setting conditions for the pro photopaper mode are as follows.

Kind of paper: Pro photopaper
Printing quality: Beautiful
Color adjustment: Automatic Example 1

In Example 1, a recorded article was produced by using the inks BK1 and BK7, and a reaction liquid in combination. An apparatus having a mechanism shown in FIG. 1 with which a reaction liquid was applied to a recording medium by means of an applying roller was used to apply the reaction liquid to each of the above plain papers. After the reaction liquid had been fixed to the recording medium, the ink BK1 was mounted on a black ink position of an ink-jet recording apparatus BJF 900 (manufactured by CANON Inc.) to print a letter including a solid print portion measuring 2 cm×2 cm with a duty of 100%. Furthermore, the ink BK7 was mounted on a photocyan ink position of the ink-jet recording apparatus BJF900 (manufactured by CANON Inc.) to print, on each of the above gloss recording media to which no reaction liquid was applied, a solid print image measuring 5 cm×5 cm with its duty changed up to 100% in an increment of 10%.

Example 2

In Example 2, a recorded article was produced in the same manner as that described above by using the inks BK2 and BK7, and a reaction liquid in combination. The ink BK2 was used for printing a letter on plain paper to which the reaction liquid had been applied, and the ink BK7 was used for printing a letter on a glossy recording medium.

Example 3

In Example 3, a recorded article was produced in the same manner as that described above by using the inks BK3 and BK8, and a reaction liquid in combination. The ink BK3 was used for printing a letter on plain paper to which the reaction liquid had been applied, and the ink BK8 was used for printing a letter on a glossy recording medium.

Example 4

In Example 4, a recorded article was produced in the same manner as that described above by using the inks BK4 and BK8, and a reaction liquid in combination. The ink BK4 was used for printing a letter on plain paper to which the reaction liquid had been applied, and the ink BK8 was used for printing a letter on a glossy recording medium.

Example 5

In Example 5, a recorded article was produced in the same manner as that described above by using the inks BK2 and BK9, and a reaction liquid in combination. The ink BK2 was used for printing a letter on plain paper to which the reaction liquid had been applied, and the ink BK9 was used for printing a letter on a glossy recording medium.

Example 6

In Example 6, a recorded article was produced in the same manner as that described above by using the inks BK2 and BK10, and a reaction liquid in combination. The ink BK2 was used for printing a letter on plain paper to which the reaction liquid had been applied, and the ink BK10 was used for printing a letter on a glossy recording medium.

Example 7

In Example 7, a recorded article was produced in the same manner as that described above by using the inks BK3 and BK7, and a reaction liquid in combination. The ink BK3 was used for printing a letter on plain paper to which the reaction liquid had been applied, and the ink BK7 was used for printing a letter on a glossy recording medium.

Example 8

In Example 8, a recorded article was produced in the same manner as that described above by using the inks BK8 and BK11 and a reaction liquid in combination. The ink BK11 was used for printing a letter on plain paper to which the reaction liquid had been applied, and the ink BK8 was used for printing a letter on a glossy recording medium.

Reference Example 1

In Reference Example 1, a recorded article was produced in the same manner as that described above by using the ink BK2 and a reaction liquid in combination. The ink BK2 was used for printing a letter on each of plain paper to which the reaction liquid had been applied and a glossy recording medium.

Reference Example 2

In Reference Example 2, a recorded article was produced in the same manner as that described above by using the ink BK3 and a reaction liquid in combination. The ink BK3 was used for printing a letter on each of plain paper to which the reaction liquid had been applied and a glossy recording medium.

Comparative Example 1

In Comparative Example 1, a recorded article was produced in the same manner as that described above by using the inks BK1 and BK7, and a reaction liquid in combination. The ink BK7 was used for printing a letter on plain paper to which the reaction liquid had been applied, and the ink BK1 was used for printing a letter on a glossy recording medium.

Comparative Example 2

In Comparative Example 2, a recorded article was produced in the same manner as that described above by using the ink BK7 and a reaction liquid in combination. The ink BK7 was used for printing a letter on each of plain paper to which the reaction liquid had been applied and a glossy recording medium.

Comparative Example 3

In Comparative Example 3, a recorded article was produced in the same manner as that described above by using the inks BK3 and BK7, and a reaction liquid in combination. The ink BK7 was used for printing a letter on plain paper to which the reaction liquid had been applied, and the ink BK3 was used for printing a letter on a glossy recording medium.

Comparative Example 4

In Comparative Example 4, a recorded article was produced in the same manner as that described above by using the inks BK5 and BK7, and a reaction liquid in combination. The ink BK5 was used for printing a letter on plain paper to which the reaction liquid had been applied, and the ink BK7 was used for printing a letter on a glossy recording medium.

C: There is a large difference between gloss at lower printing duties and gloss at higher printing duties, and gloss is considerably lost at higher printing duties to cause a problem in practical use.

TABLE 4

|  |  | Image Density | Gloss |
|---|---|---|---|
| Example | 1 | AA | A |
|  | 2 | AA | A |
|  | 3 | AA | A |
|  | 4 | A | A |
|  | 5 | AA | AA |
|  | 6 | AA | A |
|  | 7 | AA | A |
|  | 8 | AA | A |

TABLE 3

| | | Example | | | | | | | | | | | | | | | | Reference Example | | | | Comparative Example | | | | | | |
|---|---|---|---|---|---|---|---|---|---|---|---|---|---|---|---|---|---|---|---|---|---|---|---|---|---|---|---|---|
| | | 1 | | 2 | | 3 | | 4 | | 5 | | 6 | | 7 | | 8 | | 1 | | 2 | | 1 | | 2 | | 3 | | 4 | |
| | | A | B | A | B | A | B | A | B | A | B | A | B | A | B | A | B | A | B | A | B | A | B | A | B | A | B | A | B |
| Black Ink | BK1 | ○ | | | | | | | | | | | | | | | | | | | | ○ | | | | | | | |
| | BK2 | | | ○ | | | | | | ○ | | | | | | | | ○ | ○ | | | | | | | | | | |
| | BK3 | | | | | ○ | | | | | | ○ | | | | | | | | ○ | ○ | | ○ | | | | ○ | | |
| | BK4 | | | | | | | ○ | | | | | | | | | | | | | | | | | | | | | |
| | BK5 | | | | | | | | | | | | | | | | | | | | | | | | | | | ○ | |
| | BK6 | | | | | | | | | | | | | | | | | | | | | | | | | | | | |
| | BK7 | | ○ | | ○ | | | | | | | | ○ | | | | | | | | | | ○ | | ○ | ○ | | | ○ |
| | BK8 | | | | | | ○ | | ○ | | | | | | | | ○ | | | | | | | | | | | | |
| | BK9 | | | | | | | | | ○ | | | | | | | | | | | | | | | | | | | |
| | BK10 | | | | | | | | | | ○ | | | | | | | | | | | | | | | | | | |
| | BK11 | | | | | | | | | | | | | | | ○ | | | | | | | | | | | | | |

In the table, A represents plain paper to which a reaction liquid is applied, and B represents a glossy recording medium <Evaluation of Image Density>

The recorded article produced by printing a letter on plain paper to which a reaction liquid had been applied in each of Examples 1 to 8, Reference Examples 1 and 2, and Comparative Examples 1 to 4 was left for 1 day. After that, the image density of a solid print portion measuring 2 cm×2 cm with a duty of 100% was measured. A reflection densitometer (trade name: Macbeth RD-918; manufactured by GRETAGMACBETH) was used for measuring the image density. The evaluation criteria for an image density are as follows. Table 4 shows the results of the evaluation.
AA: Each paper has a sufficient image density.
A: Some papers do not have sufficient image densities, but have no problems in practical use.
B: Some papers do not have sufficient image densities.
C: No paper has a sufficient image density.

<Evaluation of Gloss>

The recorded article produced by printing a letter on a glossy recording medium in each of Examples 1 to 8, Reference Examples 1 and 2, and Comparative Examples 1 to 4 was left for 1 day. After that, a variation in gloss due to a difference in printing duty was visually observed and evaluated. The evaluation criteria for gloss are as follows. Table 4 shows the results of the evaluation.
AA: There is a small difference in gloss due to a printing duty, and little gloss is lost at higher printing duties.
A: There is a small difference in gloss due to a printing duty, but gloss is slightly lost at higher printing duties.
B: There is a relatively small difference in gloss due to a printing duty, but gloss is lost at higher printing duties.

TABLE 4-continued

|  |  | Image Density | Gloss |
|---|---|---|---|
| Reference Example | 1 | AA | C |
|  | 2 | AA | B |
| Comparative Example | 1 | B | C |
|  | 2 | B | A |
|  | 3 | B | B |
|  | 4 | B | A |

In the recorded article obtained in each of Examples 8 and 3 by printing a letter on plain paper to which a reaction liquid had been applied, Example 8 using the ink BK11 having a high ratio of a poor medium to a pigment provided a larger number of plain papers with high image densities than that of Example 3.

[Evaluation of Fixability]
<Production of Recorded Article>

Recorded articles of Examples 9 and 10, Comparative Example 5, and Reference Example 3 were produced by using the respective BK inks and a reaction liquid thus prepared in combination as shown below. Used for the production of the recorded articles were an apparatus having a mechanism shown in FIG. 1 with which a reaction liquid was applied to a recording medium by means of an applying roller and an ink-jet recording apparatus BJF 900 (manufactured by CANON Inc.) having an on-demand multi-recording head for ejecting ink by applying thermal energy to the ink in accordance with a recording signal. To be specific, the reaction liquid was applied and fixed to a recording medium (plain paper) before each ink was applied to the recording medium to form an image. The speed of the roller and the pressure at which the roller contacted with the recording medium were adjusted in such a manner that the amount of the reaction liquid to be applied would be 2.4 g/m².

Example 9

In Example 9, a recorded article was produced by using the ink BK2 and a reaction liquid in combination. An apparatus having a mechanism shown in FIG. 1 with which a reaction liquid was applied to a recording medium by means of an applying roller was used to apply the reaction liquid to plain paper (PPC paper PB PAPER; manufactured by CANON Inc.). After the reaction liquid had been fixed to the recording medium, the ink BK2 was mounted on a black ink position of an ink-jet recording apparatus BJF 900 (manufactured by CANON Inc.) to print a letter including a solid print portion measuring 2 cm×2 cm with a duty of 100%.

Example 10

In Example 10, a recorded article was produced in the same manner as that described above by using the ink BK3 and a reaction liquid in combination.

Comparative Example 5

In Comparative Example 5, a recorded article was produced in the same manner as that described above by using the ink BK7 and a reaction liquid in combination.

Reference Example 3

In Reference Example 3, a recorded article was produced by using the ink BK2 and a reaction liquid in combination. The reaction liquid was mounted on a black ink position of an ink-jet recording apparatus BJF 900 (manufactured by CANON Inc.), and the ink BK2 was mounted on a photocyan ink position of the apparatus. Then, the reaction liquid was ejected. Immediately after that, the ink BK2 was ejected to be applied to a portion to which the reaction liquid had been applied to print a letter including a solid print portion measuring 2 cm×2 cm with a duty of 100% on plain paper (PPC paper PB PAPER; manufactured by CANON Inc.). At this time, the ink was applied before the completion of the fixation of the reaction liquid to the recording medium.

<Evaluation of Fixability>

10 seconds after the printing of a letter on a recording medium to obtain each of the recorded articles of Examples 9 and 10, Comparative Example 5, and Reference Example 3, the recorded article was rubbed with a finger in a direction from a printed portion to a non-printed portion to evaluate the degree to which ink adhered to the non-printed portion of the recording medium. The evaluation criteria for fixability are as follows. Table 5 shows the results of the evaluation.

A: Nearly no ink adheres to the non-printed portion of the recording medium.
B: Ink is observed to adhere to the non-printed portion of the recording medium, but the adhesion causes no problem in practical use.
C: The adhesion of ink to the non-printed portion of the recording medium is remarkably observed.

TABLE 5

|  |  | Fixability |
|---|---|---|
| Example | 9 | A |
|  | 10 | A |
| Comparative Example | 5 | B |
| Reference Example | 3 | B |

<Evaluation of Storage Stability>

Each of the inks BK1 to BK11 was charged into a shot bottle, and the bottle was tightly stopped. After the bottle had been stored in an oven at 60° C. for 2 weeks, the state of the ink was observed. The evaluation criteria for storage stability are as follows. Table 6 shows the results of the evaluation.

A: A coloring material is uniformly and stably dispersed into ink.
B: Ink is gelled, the upper portion of the ink is transparent, or the ink is apparently thickened.

TABLE 6

|  |  | Storage stability |
|---|---|---|
| Black ink | BK1 | A |
|  | BK2 | A |
|  | BK3 | A |
|  | BK4 | A |
|  | BK5 | B |
|  | BK6 | A |
|  | BK7 | A |
|  | BK8 | A |
|  | BK9 | A |
|  | BK10 | A |
|  | BK11 | A |

[Evaluation of Color Mixing (Bleeding) of Images]
<Preparation of Color Inks>

In evaluating bleeding, color inks (a cyan ink, a magenta ink, and a yellow ink) were prepared. The respective components shown below were mixed and sufficiently stirred. After that, the resultant was filtered through a microfilter having a pore size of 0.2 μm (manufactured by Fuji Photo Film Co., Ltd.) under pressure to prepare each color ink.

(Cyan Ink)

| C.I. Direct Blue 199 | 3.5 parts |
|---|---|
| Glycerin | 7.5 parts |
| Diethylene glycol | 7.5 parts |
| Acetylenol E-100 | 1.0 part |
| Pure water | 80.5 parts |

(Magenta Ink)

| C.I. Acid Red 289 | 2.5 parts |
|---|---|
| Glycerin | 7.5 parts |
| Diethylene glycol | 7.5 parts |
| Acetylenol E-100 | 1.0 part |
| Pure water | 81.5 parts |

(Yellow Ink)

| C.I. Direct Yellow 86 | 2.5 parts |
|---|---|
| Glycerin | 7.5 parts |

-continued

| | |
|---|---|
| Diethylene glycol | 7.5 parts |
| Acetylenol E-100 | 1.0 part |
| Pure water | 81.5 parts |

<Production of Recorded Article>

Each of the black inks BK1 and BK2, and the color inks thus prepared were combined as shown in Table 7 below, and were mounted on an ink-jet recording apparatus having respective recording heads shown in Table 7 to produce a recorded article having solid print portions of black and respective colors (yellow, magenta, and cyan) printed so as to be adjacent to each other. Used for the production of the recorded article were an apparatus having a mechanism shown in FIG. 1 with which a reaction liquid was applied to a recording medium by means of an applying roller and a recording medium obtained by applying a reaction liquid to a PB-PAPER (manufactured by CANON Inc.). No ink was mounted on the position BKII shown in each of FIGS. 5 and 6.

TABLE 7

| | | Black ink | Head constitution |
|---|---|---|---|
| Example | 11 | Bk1 | FIG. 5 |
| | 12 | Bk2 | FIG. 6 |
| | 13 | Bk1 | FIG. 7 |
| | 14 | Bk2 | FIG. 8 |

<Evaluation of Color Mixing (Bleeding) of Images>

The degree of bleeding at a boundary between black and each color was visually observed in each of the recorded articles obtained in Examples 11 to 14. The evaluation criteria for color mixing (bleeding) of images are as follows. Table 8 shows the results of the evaluation.

AA: No bleeding is observed.
A: Nearly no bleeding is remarkable.
B: Bleeding is surely observed, but has no problem in practical use.
C: Bleeding occurs to the extent that a border line between colors is unclear.

TABLE 8

| | | Color mixing (bleeding) of images |
|---|---|---|
| Example | 11 | A |
| | 12 | A |
| | 13 | AA |
| | 14 | AA |

This application claims priority from Japanese Patent Application Nos. 2004-190555 filed on Jun. 28, 2004 and 2004-190573 filed on Jun. 28, 2004, which are hereby incorporated by reference herein.

What is claimed is:

1. An image-forming method comprising:
   forming an image on a recording medium using (a) a first aqueous ink comprising (1) water, (2) a water-insoluble coloring material, and (3) a plurality of water-soluble organic solvents, (b) a second aqueous ink comprising a water-insoluble coloring material, and (c) a reaction liquid capable of making the state of dissolution or dispersion of the water-insoluble coloring material in the first aqueous ink unstable upon contact with the first aqueous ink,
   wherein the first aqueous ink and the second aqueous ink have the same hue,
   wherein, of the first aqueous ink and the second aqueous ink, only the first aqueous ink is applied to an area of the recording medium where an aqueous ink is applied so as to contact with the reaction liquid,
   wherein at least the second aqueous ink is applied to an area of the recording medium where the reaction liquid is not applied,
   wherein the plurality of water-insoluble organic solvents in the first aqueous ink include a good medium for the water-insoluble coloring material and a poor medium for the water-insoluble coloring material, and
   wherein the ratio B/A in the first aqueous ink is more than the ratio B/A in the second aqueous ink, where A denotes the total content (mass %) of good medium based on the total mass of the aqueous ink and B denotes the total content (mass %) of poor medium based on the total mass of the aqueous ink.

2. The image-forming method according to claim 1, wherein the total content (mass %) of the poor medium in the first aqueous ink is 4 mass % or more based on the total mass of the ink.

3. The image-forming method according to claim 1, wherein the ratio B/A of the first aqueous ink is 0.5 or more and 3 or less, and
   wherein a water-soluble organic solvent showing a maximum Ka value out of the respective Ka values of the plurality of water-soluble organic solvents in the first aqueous ink, as determined by the Bristow method, is the poor medium.

4. The image-forming method according to claim 1, wherein the ratio B/A in the second aqueous ink is less than 0.5.

5. The image-forming method according to claim 1, wherein the content (mass %) of the water-insoluble coloring material in the first aqueous ink is more than the content (mass %) of the water-insoluble coloring material in the second aqueous ink.

6. The image-forming method according to claim 1, wherein the content (mass %) of the water-insoluble coloring material in the first aqueous ink is substantially equal to the content (mass %) of the water-insoluble coloring material in the second aqueous ink.

7. The image-forming method according to claim 1, wherein in the first aqueous ink, the water-insoluble coloring material comprises a self-dispersion organic pigment or self-dispersion carbon black having at least one kind of hydrophilic group bonded to a surface of a water-insoluble coloring material particle directly or via another atomic group.

8. The image-forming method according claim 1, wherein in the second aqueous ink, the water-insoluble coloring material comprises a resin-dispersed pigment.

9. The image-forming method according to claim 1, wherein the first aqueous ink and the second aqueous ink are ejected by means of an ink-jet method.

10. The image-forming method according to claim 1, wherein only the second aqueous ink is applied to the area of the recording medium where the reaction liquid is not applied.

11. An image-forming method comprising:
   forming an image on a recording medium using (a) a first aqueous ink comprising a self-dispersion pigment, (b) a second aqueous ink comprising a resin-dispersed pigment, and (c) a reaction liquid capable of making the state of dissolution or dispersion of the self-dispersion pigment in the first aqueous ink unstable on contact with the first aqueous ink, wherein, of the first aqueous ink and the second aqueous ink, only the first aqueous ink is applied to an area of the recording medium where an aqueous ink is applied so as to contact with the reaction liquid, and wherein at least the second aqueous ink is applied to an area of the recording medium where the reaction liquid is not applied.

12. The image-forming method according to claim 11, wherein the first aqueous ink and the second aqueous ink have the same hue.

13. An image-forming method comprising:

forming an image on a recording medium using (1) a first aqueous ink comprising (a) water, (b) a water-insoluble coloring material, and (c) a plurality of water-soluble organic solvents and (2) a second aqueous ink comprising a water-insoluble coloring material; and selectively performing a step of applying on a recording medium a reaction liquid being capable of making the state of dissolution or dispersion of the water-insoluble coloring material in the first aqueous ink unstable on contact with the first aqueous ink, wherein the first aqueous ink and the second aqueous inks have the same hue, wherein the first aqueous ink is used only if the step of applying the reaction liquid is performed, wherein the plurality of water-soluble organic solvents in the first aqueous ink include a good medium for the water-insoluble coloring material and a poor medium for the water-insoluble coloring material, and wherein the ratio B/A in the first aqueous ink is more than the ratio B/A in the second aqueous ink, where A denotes the total content (mass %) of good medium based on the total mass of the aqueous ink and B denotes the total content (mass %) of poor medium based on the total mass of the aqueous ink.

* * * * *